(12) United States Patent
Blemel et al.

(10) Patent No.: US 12,105,803 B2
(45) Date of Patent: *Oct. 1, 2024

(54) APPARATUS AND APPLICATION DEVICE FOR PROTECTION OF SECURITY

(71) Applicants: Peter Andrew Blemel, Albuquerque, NM (US); Kenneth Gerald Blemel, Albuquerque, NM (US); Carl R Stern, Albuquerque, NM (US)

(72) Inventors: Peter Andrew Blemel, Albuquerque, NM (US); Kenneth Gerald Blemel, Albuquerque, NM (US); Carl R Stern, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 18/389,503

(22) Filed: Nov. 14, 2023

(65) Prior Publication Data
US 2024/0086537 A1  Mar. 14, 2024

Related U.S. Application Data

(63) Continuation of application No. 17/206,082, filed on Mar. 18, 2021, now abandoned.
(Continued)

(51) Int. Cl.
*G06F 21/56* (2013.01)
*G06F 9/455* (2018.01)
(Continued)

(52) U.S. Cl.
CPC ........ *G06F 21/566* (2013.01); *G06F 9/45541* (2013.01); *G06F 9/45558* (2013.01);
(Continued)

(58) Field of Classification Search
CPC .............. G06F 21/566; G06F 9/45541; G06F 9/45558; G06F 21/604; G06F 2009/45587; G06F 2221/034; G06F 21/6245; G06F 21/71; G06N 3/004; G06N 3/12; G06N 5/022; G06N 3/006; G06N 5/025; G06N 5/04; G06N 7/01
See application file for complete search history.

(56) References Cited

U.S. PATENT DOCUMENTS

2007/0288418 A1* 12/2007 Pope ..................... G06N 7/01
706/53
2009/0164994 A1* 6/2009 Vasilevsky .......... G06F 9/45533
718/1

(Continued)

*Primary Examiner* — Bruce S Ashley

(57) ABSTRACT

A self-programming synthesizer with neuroplastic behavior using variable binding and substitution that, on input of a data n, produces a new algorithm f(n) as well as affects an existing algorithm f(n). The synthesizer comprises at least one bare metal and a plethoral of coprocessors, an inference calculus implemented n reprogrammable logic. The synthesizer may also include a microvisor, analog-to-digital conversion and digital-to-analog outputs for some applications. Additionally, the synthesizer may include an internal or separate external clock frequency generator. The portion of plasticity provided by the inference calculus adds a reconfigurable artificial intelligence. The invention combines dynamic threat detection with direct control of system resources to detect and mitigate threats and anneal the system from cyber attack.

5 Claims, 6 Drawing Sheets

Related U.S. Application Data

Figure 1:
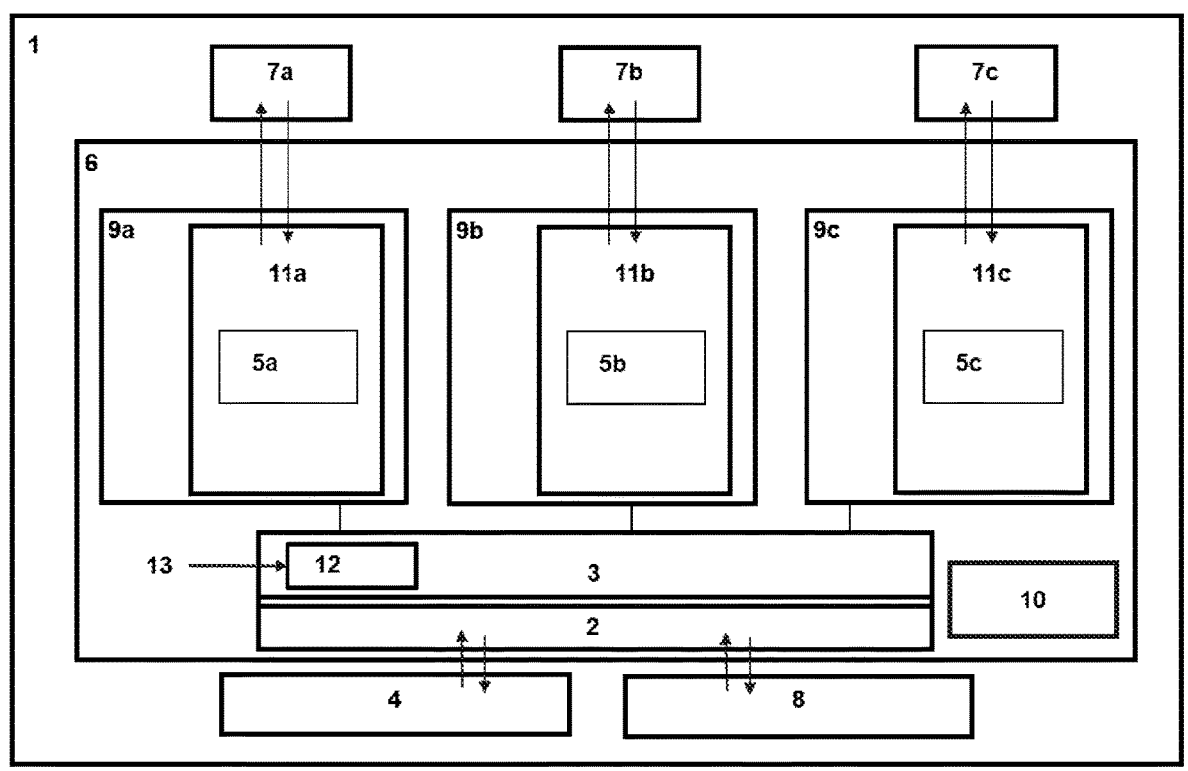

(60) Provisional application No. 62/991,726, filed on Mar. 19, 2020.

(51) Int. Cl.
*G06F 21/60* (2013.01)
*G06N 3/004* (2023.01)

(52) U.S. Cl.
CPC .. *G06F 21/604* (2013.01); *G06F 2009/45587* (2013.01); *G06F 2221/034* (2013.01); *G06N 3/004* (2013.01)

(56) References Cited

U.S. PATENT DOCUMENTS

| | | | | |
|---|---|---|---|---|
| 2011/0258621 | A1* | 10/2011 | Kern | G06F 9/45558 718/1 |
| 2019/0034785 | A1* | 1/2019 | Murray | G06N 3/084 |
| 2020/0004752 | A1* | 1/2020 | Majumdar | G06N 3/006 |

* cited by examiner

APPARATUS AND APPLICATION DEVICE FOR PROTECTION OF SECURITY

CROSS-REFERENCE TO RELATED APPLICATIONS AND CLAIM OF PRIORITY

This application is a continuation of co-pending application Ser. No. 17/206,082 filed on 18 Mar. 2021 entitled "Novel Apparatus and Application Device for Protection of Data and Information," which claims the benefit of U.S. provisional application Ser. No. U.S. 62/991,726 filed on 19 Mar. 2020 entitled, "Novel Apparatus and Application Device for Protection of Data and Information". All of the above applications are hereby incorporated by reference for all that they disclose and for all purposes.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

DEFINITIONS OF TERMS USED HEREIN

The terminology used herein is for the purpose of describing particular embodiments only and is not intended to be limiting of the invention. The following are definitions of terms used herein.

Active Rule Set: A collection of rules executing at the current time after actuation and based upon conditions, available data, and events.

Agent: Artificial intelligence program that performs computer operations such as, but not limited to, inductive, abductive and deductive reasoning; model construction; model repair; assimilation; recall from memory; prediction; communication, and other actions that facilitate or support execution of rules.

Algorithm: Source: Merriam Webster dictionary (merriam-webster.com): "A procedure for solving a logical or mathematical problem in a finite number of steps."

Anneal: to toughen the cyber-physical system against threats and stresses.

Artificial Intelligence (AI): Software algorithms that are able to perform tasks that normally require human intelligence, such as learning relationships, inference based learning, understanding, anticipation, decision-making and managing future events by determining probabilistically the relationship between cause and effect events based on probabilities for creating, adapting and evolving new neural models and history to accurately represent changing and evolving situations to temporally observe what is happening and make changes as context changes such as when environments and objects come and go, or when modalities of causal interaction change.

Bare Metal Processing: A function implemented in, or executing on, the lowest level of a processing architecture, such as, but not limited to, a central processing unit (CPU), silicon on modile (SoM), silicon on chip (SoC), silicon on sapphire (SOS), complementary silicon of sapphire (CMOS).

Bare Metal Components: Semiconductor-based components of a computing machine.

Bayesian: Source: Merriam Webster dictionary (merriam-webster.com): "Being, relating to, or involving statistical methods that assign probabilities or distributions to events (such as rain tomorrow) or parameters (such as a population mean) that apply Bayes' theorem to revise the probabilities and distributions after obtaining experimental data."

Bayesian Calculus: A probabilistic mathematical model that computes conditional dependencies of a set of variables and probabilistic relationships.

Bayesian Inference: Probabilistic reasoning that uses inductive, abductive, and/or deductive logic to produce probabilistic metrics from observed data.

Bayesian Networks: Source: wikipedia.org: a graphical probabilistic model.

Bayesian Programming: Source: wikipedia.org:_Bayesian programming is a formalism and a methodology for having a technique to specify probabilistic models and solve problems when less than the necessary information is available. Bayesian programming may also be seen as an algebraic formalism to specify graphical models such as, for instance, Bayesian Networks, Dynamic Bayesian Networks, Kalman filters, or Hidden Markov Models.

Bootloader: The software that manages the startup (boot) process of a computing device.

Cellular Automata Source: plato.stanford.edu: Cellular Automata are discrete, abstract Turing machine-like computational systems comprised of a number of simple logic cells which may be such as, but not limited to, AND, OR, Not AND (NAND), Not OR (NOR) that can emulate a universal Turing machine and therefore compute anything computable by parallel instantiation of one of a finite set of states at discrete time steps, following state update functions or dynamical transition rules.

Context: Source: Merriam-Webster dictionary (www.merriam-webster.com): "The interrelated conditions in which something exists or occurs."

Coding Algorithm: Source: lexico.com: "A process or set of rules to be followed in calculations or other problem-solving operations by a computer."

Cross-Domain Cybersecurity: Software-hardware systems that make secure access to and exchange of sensitive data across processing units or networks having various levels of security classification, including incompatible security domains.

Cross Domain Solution (CDS): A cross-domain solution (CDS) is an integrated information assurance system composed of specialized software, and sometimes hardware, that provides a controlled interface to manually or automatically enable and/or restrict the access or transfer of information between two or more security domains based on a predetermined security policy such as, for example, National Institute of Science and Technology (NIST) policy 800.53 and 800.170. CDSs are designed to enforce domain separation and typically include some form of content filtering, which is used to designate information that is unauthorized for transfer between security domains or levels of classification.

Cybersecurity: Source: riskmanagementstudio.com: "The state of being protected against the unauthorized use of electronic data, or the measures taken to achieve this."

Data Factory: Data factories are a software resource that facilitates the use of rules. Data factories execute periodically with no input and produce output. Data Factories may include models of data distributions; supports simulation without live data feed for development; emulate data sources; mimic a data rate; or retrieve recorded data at a fixed rate.

Deterministic Algorithm: Source: wikipedia.org: "In computer science, a deterministic algorithm is an algorithm which, given a particular input, will always produce the same output, with the underlying machine always passing through the same sequence of states."

Deterministic Time: Source: wikipedia.org: "In computational complexity theory, DTIME (or TIME) is the computational resource of computation time for a deterministic Turing machine. It represents the amount of time (or number of computation steps) that a "normal" physical computer would take to solve a certain computational problem using a certain algorithm."

Dynamic Bayesian Networks: Source: wikipedia.org: A Dynamic Bayesian Network (DBN) is a Bayesian network (BN) which relates variables to each other over adjacent time steps. This is often called a Two-Timeslice BN (2TBN) because it says that at any point in time T, the value of a variable can be calculated from the internal regressors and the immediate prior value (time T−1). DBNs unify and extend traditional linear state-space models, linear and normal forecasting models and dependency models such as hidden-Markov models (HMM) into a general probabilistic representation and inference mechanism for arbitrary non-linear and non-normal time-dependent domains.

Event Logging: Event logging may include recording of system events and data during execution of rule sets. The recorded data may include a date and time stamp.

Field-Programmable: Source: wikipedia.org: "An electronic device or embedded system is said to be field-programmable or in-place programmable if its instructions can be modified 'in the field,' without disassembling the device or returning it to its manufacturer."

Forked Action Queue: An ordered list of actions to be performed asynchronously. Examples: Shutdown, Restart, Power Down Interrupt (PDI) messages.

Graphical Model: Source: wikipedia.org: "A graphical model is a probabilistic model for which a graph expresses the conditional dependence structure between random variables."

Bare Metal Processor: Source: wikipedia.org: "In computer science, bare machine (or bare metal) refers to a computer executing instructions directly on logical hardware without an intervening operating system.

Hardcore Processor: Source: electronics.stackexchange.com: "A hard-core processor is a processor that's actually physically implemented as a structure in the silicon."

Horn Clause: Source: mathworld.wolfram.com: A clause (i.e., a disjunction of literals) is called a Horn clause if it contains at most one positive literal. Horn clauses express a subset of statements of first-order logic. Horn clauses are usually written as: $L_1, \ldots L_n \Rightarrow L$ ($\equiv \neg L_1 \vee \ldots \vee \neg L_n \vee L$) or $L_1, \ldots, L_n \Rightarrow (\equiv \neg L_1 \vee \ldots \vee \neg L_n)$, where $n \geq 0$ and L is the only positive literal. A Definite clause is a Horn clause that has exactly one positive literal. A Horn clause without a positive literal is called a goal.

Hybrid Synthesizer: A machine that performs analog, digital and logic functions.

Hypervisor: A specialized automated control algorithm, firmware, or hardware for controlling how computer resources such as, but not limited to, processors, memory, and peripheral devices are shared or restricted, including, but not limited to, enabling virtualization and permitting access to (or preventing unauthorized access to) said resources by programming algorithms. Also known as a virtual machine monitor or VMM.

Inference: Source: merriam-webster.com: "The act or process of inferring: such as the act of passing from one proposition, statement, or judgment considered as true to another whose truth is believed to follow from that of the former."

Kernel: Source: linux.com: "The lowest level of the operating system that manages the CPU, memory, and peripheral devices."

Lambda Calculus (also written as λ-calculus): Source: wikipedia.org: "A formal system in mathematical logic for expressing computation based on function abstraction and application using variable binding and substitution. It is a universal model of computation that can be used to simulate any Turing machine."

Logic Programming: Source: govst.edu: "A logic program is a set of clauses with the restriction that there is exactly one positive literal in each clause. Such clauses are often called definite clauses. Example. Let p(x, y) mean x is a parent of y and let g(x, y) mean x is a grandparent of y. Here are some ways to represent a definition of the grandparent relation.

First-order logic: $\forall x \forall y \forall z \, (p(x, z) \wedge p(z, y) \rightarrow g(x, y))$.
First-order clause: $g(x, y) \vee \neg p(x, z) \vee \neg p(z, y)$.
Logic programming: $g(x, y) \leftarrow p(x, z), p(z, y)$.
Prolog: g(X, Y):−p(X Z), p(Z, Y).

Logical Connective: Source: wikipedia.org: "A logical connective is a symbol or word used to connect two or more sentences in a grammatically valid way, such that the value of the compound sentence produced depends only on that of the original sentences and on the meaning of the connective.

Logicize: Source: merriam-webster.com: To make logical, convert to logical form.

Loopy Logic: Source: Daniel Pless and George Luger, (incorporated by reference in the list of non-patent documents as citation #1): A Turing Complete extension of the formal Bayesian logic programming language of Kersting and De Raedt (incorporated by reference in the list of non-patent documents as citation #2) specialized by using learnable distributions for effective combining of Horn clause heads using loopy belief propagation of Pearl, (incorporated by reference in the list of non-patent documents as citation #3) for the inference algorithm together with a message passing algorithm based on Expectation Maximization for estimating the learned parameters in the general case of models as well as second order unification and equality predicates.

Map-Reduce Tasks: An algorithm and an associated implementation for processing data, including, but not limited to, transforming or controlling the amount of data to be processed by an algorithm. Examples: If value>max then enable Rule (name); set execution bounds: Time (Iterate over most recent 30 seconds of value occurrences); Iterations (iterate over 10 most recent occurrences of value); Value (iterate over all occurrences of value>max); Conditional: (Single most recent occurrence of value>max).

Markov Network: Source: wikipedia.org: A Markov network or Markov field is a set of random variables having a Markov property described by an undirected graph. A random field is said to be a Markov random field if it satisfies Markov properties.

Markov Property: Source: wikipedia.org: "The term Markov property refers to a property of a stochastic process. It is named after the Russian mathematician Andrey Markov."

Microcircuit: An electronic circuit comprised of a multiplicity of digital logic.

Microvisor: A specialized automated control algorithm that, similar to a hypervisor, facilitates the sharing of resources between algorithms and their implementations.

Neuromorphic Architectures: Source: ieeeexplore.ieee.org: Neuromorphic architectures are devices or systems that "use the principles of neural function for their basis of operation. Their goal is to harness biologically inspired concepts such as weighted connections, activation thresholds, short- and long-term potentiation, and inhibition to solve problems in distributed computation."

Neuromorphic Computing: Source: intel.com: Neuromorphic computing emulates the neural structure of the human brain.

Non-Deterministic Polynomial Hardness (NP-Hardness): Source: wikipedia.org: "NP-hardness is the defining property of a class of mathematical problems that can not be completed in polynomial time complexity; informally 'at least as hard as the hardest problems in NP'."

NP-Hard: Source: wikipedia.org: "In computational complexity theory, NP-hardness (non-deterministic polynomial-time hardness) is the defining property of a class of problems that are informally 'at least as hard as the hardest problems in NP'. A simple example of an NP-hard problem is the subset sum problem."

Plasticity: Noun: Source: merriam-webster.com: "The capacity for continuous alteration of the neural pathways and synapses in response to experience" in combinations of, in any amount and order, electronic circuits that map truth including, but not limited to, "OR", "AND", "NAND (not AND)", "NOR (not OR)", "X-OR (exclusive OR)", algorithms, and pseudocode.

Pseudocode: Pseudocode is a notation resembling a programming language.

Operating System: Source: sites.google.com: "The software that supports an synthesizer's basic functions, such as scheduling tasks, executing applications, and controlling peripherals."

Query or Goal: Source: govst.edu: "A query or goal is defined as a question that asks whether the program infers something. The something is a sequence of one or more atoms and the question is whether there is a substitution that can be applied to the atoms so that the resulting atoms are inferred by the program. Example. Suppose we have the following little logic program.
p(a, b).
p(b, d).
g(x, y)←p(x, z), p(z, y).
Let g(a, w) be a query. It asks whether a has a grandchild. If we let θ={w/d}, then g(a, w))θ=g(a, d), which says a has a grandchild d. This follows from the two program facts p(a, b) and p(b, d) and the definition of g. So g(a, d) is inferred by the program.

Recursion: Source: merriam-webster.com: "The determination of a succession of elements (such as numbers or functions) by operation on one or more preceding elements according to a rule or formula involving a finite number of steps."

Rule: A rule is a specification in first-order logic expressing calculation structured using the Lambda Calculus for making a decision or action.

Rule Actions: A result of a rule making a decision, or things that must be done prior to or as a result of making a decision. I.e., user functions, i/o and network processing; storing data in volatile or non-volatile memory, formatting data (e.g., as Comma Separated Variables); retrieving data from other processes; or providing data to other processes.

Rule Controls: Metadata which define the policy and conditions (contract) that apply to the use of a rule, such as but not limited to: information concerning the scheduling rate; time until next estimated transition; or an instruction sequence that is performed when a rule is executed.

Rule Inputs: Inputs may include a collection of data items that are prerequisites for the rule to execute; information representing system states, data available from sources, and other rules. Rule inputs may include event data, data from discrete inputs, and semaphore data.

Rule Outputs: Outputs of a rule may be discrete or continuous including, but not limited to, data and actions.

Rule Resources: Consumable resources, such as but not limited to, time to execute on a benchmark processor; amount of storage, and amount of network bandwidth.

Rule Schedule: A specific evaluation order of the Active Rule Set based upon priorities.

Rule Set: A rule set is a collection of Rules that is stored, loaded, or unloaded based upon context or conditions or an action.

Rules Engine: Software responsible for organizing and executing Rule Sets.

Softcore Processor: Source: wikipedia.com: "A soft microprocessor (also called softcore microprocessor or a soft processor) is a processor that can be wholly implemented using logic synthesis. It can be implemented via different semiconductor devices containing programmable logic such as a Field Programmable Gate Array (FPGA), a complex programmable electronic logic device or a processor with software programmable logic circuits."

SLD Resolution (Selective Linear Definite Clause Resolution): Source: wikipedia.org: "The basic inference rule used in logic programming. It is a refinement of resolution, which is both sound and refutation complete for Horn Clauses.

State Changing Events: Events that may alter task processing include, but are not limited to, an interrupt such as a Power Down Interrupt (PDI); an error (exception) occurring; a timer timing out; a periodic interrupt such as a heartbeat from connected device; a resource becoming free; a discrete input changing state; an event pulse; an input device generating a necessary data; and data being passed from one application to another.

Stochastic Model: Source: wikipedia.org: A stochastic model, also known as a stochastic process, is a collection of random variables that is indexed by some mathematical set, meaning that each random variable of the stochastic process is uniquely associated with an element in the set."

Synthesis: The composition or combination of parts or elements so as to form a whole with inductive, abductive and inductive reasoning with the dialectic combination of thesis and antithesis into a higher stage of truth.

Synthesizer: A machine that performs functions according to self-generated instructions.

System Events: activities of the processor; can change the rules execution set and schedule. Examples: Shutdown, restart, or priority messages posted by processor.

Task: An encapsulation of a Rule or Rule Set. Tasks may run synchronously or asynchronously along with other tasks.

Task States: Task states include, but are not limited to, being created; created; registered to await an event; and executing.

Turing Complete: Source: wikipedia.org: "In computability theory, a system of data-manipulation rules (such as a computer's instruction set, a programming language, or a cellular automation) is said to be Turing Complete (or computationally universal) if it can be used to simulate any Turing machine. This means that this system is able to recognize or decide other data-manipulation rule sets. Turing completeness is used as a way to express the power of such a data-manipulation rule set. To show that something is Turing-complete, it is enough to show that it can be used to simulate some Turing-complete system. For example, an imperative language is Turing-complete if it has conditional branching (e.g., "if" and "goto" statements, or a "branch if zero" instruction; see one-instruction set computer) and the ability to change an arbitrary amount of (e.g., the ability to maintain an arbitrary number of data items)."

Turing Complete Calculus: A system of data-manipulation rules that can be used to simulate any Turing machine and that, as a system, is able to recognize or decide other data-manipulation rule sets.

Turing Machine: Source: Merriam Webster dictionary (merriam-webster.com): "An abstract machine which manipulates symbols according to a table of rules. Given any computer algorithm, a Turing machine capable of simulating that algorithm's logic can be constructed. In computational complexity discipline, in a deterministic Turing machine, the set of rules impose at most one action to be performed for any given situation. In a nondeterministic Turing machine, it may have a set of rules that prescribes more than one action for a given situation."

Universal Turning Machine: Source: wikipedia.org: "A universal Turing machine can be used to simulate any Turing machine and by extension the computation aspects of any possible real-world computer."

User Functions: A special case of an action that is executed as necessary when it appears in a Rule's conditions or actions. For example: mathematical operations, data transforms, data storage requests, data transmission requests.

Virtual Machine (VM): A software-defined computing architecture that provides the functionality of a physical computer to run algorithms such as, but not limited to, operating systems or applications. VM implementations may involve specialized hardware, software, or a combination thereof. Each virtual machine functions separately from the other VMs, even when they are all running on the same physical computer.

FIELD OF THE INVENTION

The present invention generally relates to reprogrammable computing devices with fixed software algorithms stored in memory devices that perform analog and digital data collection, digital and analog signal processing, as well as generating digital and analog outputs. The present invention also relates to interpreting sensor data in a complex real-time environment with ongoing reassessment of interpretive models and assumptions when the nature of the situation changes such as from sensor failure, when objects in the sensor field come and go, or when modalities of causal interaction change. Yet more specifically, the present invention relates to an apparatus with an operating system controlled by artificial intelligence performed by computer processing in real time of analog signal and/or digital information under control of a microvisor.

Relation to Prior Art

Prior art with relation to the present invention are sensing systems, control systems, and data processing systems. Since modern systems often employ very large networks, the standard approach of collecting and processing data is often not efficient because any approach fails when one computation becomes NP-Hard. Most of the prior art tends to make minimal assumptions about the data, hence producing general representations.

One of the major shortcomings of these approaches is that they describe stationary probability distributions, that is, these models assume constant statistical regularities in the data or operating conditions. However, models with this assumption do not always reflect the variation across contexts and do not perform well when the structure of statistical regularities of the data or operating conditions are significantly more complex. Other methods such as Sutton & Barto 1998; Everson & Roberts 1999; Pham & Cardoso 2001 cited in the list of references, assume that data statistics vary smoothly from sample to sample. This assumption frequently does not hold because many complex modeling tasks involve data with steep changes that cannot be represented by slowly evolving processes.

There are currently many different probabilistic modeling systems. Ngo and Haddawy (Haddawy 1994; Ngo & Haddawy 1997;), cited as #7 and #8 respectively in the list of non-patent documents, are the first to produce dynamic systems by joining graphical probabilistic models (Bayesian networks) using the first-order predicate calculus. Endsley (Endsley 1995) cited as #9 in the list of non-patent documents presents a theory of situation awareness using probabilistic modules for situation awareness in dynamic systems. Friedman et al. (Friedman et al. 1999), cited as #10 in the list of non-patent documents, present probabilistic relational models enabling the specification of a probability model on classes of objects rather than on simple attributes. Kersting and DeRaedt (Kersting & DeRaedt 2000), cited as #2 in the list of non-patent documents, propose another approach based on knowledge-based model construction that generates Bayesian networks specific for given queries, using a set of first-order rules with uncertainty parameters. Richardson and Domingos (Richardson & Domingos 2006), cited as #11 in the list of non-patent documents, propose a probabilistic system based on general first-order logic, sentences of which are converted into a conjunctive normal form, as opposed to restricted subsets of the general logic.

Among all of the logic-based probabilistic modeling approaches, (Ngo & Haddawy 1997), cited as #8 in the list of non-patent documents, is the only research attempt in the field of stochastic logical modeling that explicitly uses context information about the domain of interest in terms of logical sentences as a way to cut down the size of the Knowledge Base needed to answer a query.

Among all of the above logic-based probabilistic modeling approaches, (Ngo & Haddawy 1997) is the only research attempt found in the field of stochastic logical modeling that explicitly uses context information about the domain of interest in terms of logical sentences as a way to cut down the size of the Knowledge Base needed to answer a query with an explanation that acknowledges the actual cause of events. For example, if lightning strikes a tree and starts a forest fire, then it is reasonable to say that the lightning is the cause of the fire. But what is the role of the amount of oxygen in the air and dryness of the wood? It seems that there would not be a fire if the wood were wet and the air was missing oxygen.

Our searches in prior art found there is no attempt to use explicitly the notion of context nor to use an explicit context to switch between local representations with probabilistic models that represent locally stationary processes.

The probabilistic modeling research cited previously tends to make minimal assumptions about the data, hence producing general representations. One of the major shortcomings of these approaches is that they describe stationary probability distributions, that is, these models assume constant statistical regularities in the data. Over a large set of data, the stationarity assumption produces a good approximation of correct probability density. However, models with this assumption do not always reflect the variation across dynamic contexts. Further, processing a large set of data generally exceeds time constraints for real time results.

Researchers (Lee, Lewicki, & Sejnowski 2000), cited as #11 in the list of non-patent documents, have also attempted to use mixtures of models to employ local data representations; however later studies showed that such models do not perform well when the structure of statistical regularities of the data is significantly more complex. Other methods (Sutton & Barto 1998; Everson & Roberts 1999; Pham & Cardoso 2001), cited as #4, #5, and #6 respectively in the list of non-patent documents, that are more successful in representing non-stationary stochastic processes, assume that data statistics vary smoothly from sample to sample. This assumption frequently does not hold as many complex modeling tasks involve data with steep changes that cannot be represented by slowly evolving processes. In all of this research, there is no attempt to use explicitly the notion of context.

There are limitations of prior and current probabilistic modeling systems that rest on a knowledge-based model construction approach and map an entire knowledge base into an often complex graphical model of edges and nodes. As the size of the resulting network grows large, it becomes time consuming and cumbersome to manipulate, and solving the inference algorithm becomes NP-hard with each added node taking an exponentially longer time to finish probability updating. There is another limitation, however, that makes current probabilistic modeling approaches unable to support this evolution: most of these approaches are static; namely, they assume that modeling is done only once and that the entire dataset is available ahead of time.

Another limitation of current art is that interpreting distributed sensor data in a complex real-time environment can require ongoing reassessment of interpretive models and assumptions. Model revision is needed when the nature of the situation changes. Such context changes in the data can arise from sensor failure, when objects in the sensor field come and go, or when modalities of causal interaction change.

BRIEF SUMMARY OF THE INVENTION

The present invention teaches a neuromorphic apparatus implemented with reprogrammable predicate and probabilistic logic. The invention has been reduced to practice in an algorithm and associated implementation called Cognitive Bayesian Reasoning System (CBRS). CBRS comprises a Rules Engine and support software that uses probabilistic and/or discrete logic bases. CBRS evaluates these "knowledge bases" and uses the results (outputs) to control execution of other systems and software. CBRS executes actions that can be used to control or otherwise affect the behaviour or processing of other algorithms and their implementations, including, but not limited to, applications, operating systems, hypervisors, and/or hardware.

The components of CBRS include:
1) An adaptive control logic model which is an integrated second order form of integrated probabilistic and predicate logic for encoding predicate based production rules where the predicates can provide a direct link between control models and probabilistic models.
2) A set of associated programs for model compilation, learning, and context-sensitive model selection/adaptation.
3) A runtime environment suitable for embedded systems.
4) Model compilation and runtime service.
5) Linkable libraries for external applications.

The support software includes, without restriction, agents, data link libraries used by the Rules Engine load, instantiate, and process Rule Sets, which are comprised of Rules, which are, in turn, logical expressions that dynamically represent a relationship model comprised of frequently changing rules and data, i.e., are able to evolve to handle rapidly changing pieces of information. Solving in real-time means the models can evolve to handle rapidly changing pieces of information while meeting time constraints.

Rules Engine functions include, but are not limited to:
1) Reading data from memory or other sources
2) Transforming "raw" values to engineering units
3) Filtering data
4) Reducing data in quantity
5) Transforming data from one domain to another, including, but not limited to, from "frequency domain" to "time domain"
6) Model-based analytics
7) Various forms of Machine learning and Artificial Intelligence algorithms and their implementations
8) Testing values for exceedances and other conditions
9) Logging exceedances into a System Log or Rules Event Log
10) Recording data to file for offload or playback
11) Formatting data (Comma Separated Values (CSV) format or other format
12) Sending data to displays and other "consumers"
13) Affecting or controlling other algorithms and their implementations The Rules Engine library includes algorithmic frameworks for: condition monitoring and assessment; data and information fusion, including, but not limited to, a variety of mixture-of-experts models; dynamic models for prediction/prognostics including Hidden Markov Models, (HMMs), Hierarchical Hidden Markov Models (HHMMs), Stochastic Markov Models (SMMs), and Dynamic Bayesian Networks (DBNs); and statistical algorithms.

The Rules Engine library also contains Machine Learning algorithms for model induction from data and decision optimization and decision support, as well as Bayesian Decision Networks using a tightly integrated parametric Expectation Maximization (EM) learning algorithm.

For the CBRS Operating System to be deterministic, it is required that Rule Sets complete in a determinable amount of time. For example, CBRS includes a deterministic probabilistic approximation algorithm which solves in linear time, i.e., an additional node increases the solution time by a fixed amount of time.

CBRS applications are small and fast, suitable for running on embedded devices. CBRS models are compact and the deterministic with probabilistic inference based on linear time approximation algorithm. The CBRS provides analysis and fusing of data into information with digital signal processing algorithms such as Fast Fourier Transforms, wavelets, and other transforms to provide advanced analysis of the total picture at the current time, including inferring what can not be directly observed.

CBRS produces models by using a failure-driven probabilistic modeling approach to assimilate data from dynamic environments. During assimilation of data, agents update the parameters of the existing hypothesis, which, in psychology, is similar to an individual incorporating novel events and objects into an existing way of thinking. During learning by accommodation, Agents use a contextualized repair mechanism to reorganize the model to accommodate new data. In psychology, this is similar to an individual discovering new aspects of an environment that do not fit to his/her existing mental structures and, consequently, reorganizing these structures to incorporate this new information.

CBRS includes Machine Learning which enables learning of what are normal characteristics and behavior as well as learning data distributions and structural relationships that may also indicate a state transition. CBRS machine learning algorithms include, but are not limited to, K Means Clustering, Semi-Supervised Clustering, Self-Organizing Maps, K-Nearest Neighbor, Linear and Gradient Descent Regression, Radial and Kernel-Based Neural Networks, Genetic and Evolutionary Algorithm Learning, Decision Tree Classification, Single Instance Learning, and several others.

CBRS includes causal analyses using probabilistic models such as HMM and HHMM to identify what is not normal and what may be causing the abnormality.

CBRS processes Tasks comprised of Rules which have a structure of the form: head|body1, body2, . . . , bodyn=[p1, p2, . . . , pm]. The size of the conditional probability table (m) at the end of the sentence has a size equal to the arity (number of states) of the head times the product of the arities of the body. The probabilities are naturally indexed over the states of the head and the clauses in the body, but is shown with a single index for simplicity. For example, suppose x is a predicate that is valued over {red, green, blue} and y is boolean. P(x|y) is defined by the sentence x|y=[[0.1, 0.2, 0.7], [0.3, 0.3, 0.4]], here shown with the structure over the states of x and y. Terms (such as x and y) can be full predicates with structure and contain PROLOG style variables. For example, the sentence a(X)=[0.5,0.5] indicates that a is universally equally probable to take on either of two values. If we want a query to be able to unify with more than one rule head, some form of combining function is needed.

The CBRS language restricts this combining function to one that is simple, useful, and works well with Bayesian inference algorithms. Our innovation for combining sentences is a product distribution. For example, suppose there are two simple rules (facts) about some Boolean predicate a and one says that a is true with probability 0.4, the other says it is true with probability 0.7. The resulting probability for "a" is proportional to the product of the two. Thus "a" is true proportional to 0.4*0.7 and a is false proportional to 0.6*0.3. Normalizing "a" is true with probability of about 0.61. Thus, the overall distribution defined by a database is the normalized product of the distributions defined for all the sentences.

One advantage of using this product rule for defining the resulting distribution is that observations and probabilistic rules are now handled uniformly. An observation is represented by a simple fact with a probability of 1.0 for the variable to take on the observed value. Thus, a fact is simply a Horn clause with no body and a singular probability distribution, i.e., all the state probabilities are zero except for a single state. We extended the basic structure of the CBRS probabilistic logic language in a number of ways. First, by allowing second-order terms, i.e., use variables for the function symbol in predicates. A useful example of using this occurs with Boolean functions. Assuming a group of predicates whose domain is {true, false} CBRS can create a general or predicate: or (X Y)|X, Y=[1.0, 0.0, 1.0, 0.0, 1.0, 0.0, 0.0, 1.0]. Here X and Y in the body of the clause are higher order predicates. The result is two arbitrary predicates representing Boolean random variables, say a(n) and b(m,q), which can be combined to form the predicate or (a(n),b(m,q)) to get a random variable that is distributed according to the logical "or" of the two previous variables.

The probabilistic logic language of CBRS also supports simple Boolean equality predicates. These are denoted by angle brackets < >. For example, if the predicate a(n) is defined over the domain {red, green, blue} then it is a variable over {true, false} with the obvious distribution. That is, the predicate is true with the same probability that a(n) is green and is false otherwise. The final addition to our logic language is parameter fitting, i.e., learning. An example of a statement that indicates a learnable distribution is a(X) A. The capital "A" indicates that the distribution for a(X) is to be fitted. The data for learning parameter fitting is obtained from the facts and rules in the database itself. To specify an observation, one adds a fact to the database in which the variable X is bound. For example, suppose that we have the rule above and we add a set of five observations (the data) to give the following database: a(X)=A a(d1)=true a(d2)=false a(d3)=false a(d4)=true a(d5)=true. In this case, we have a single learnable distribution and five completely observed data points. The resulting distribution for a will be true 60% of the time and false 40% of the time. In this case, the variables at each data point are completely determined. In general, this is not necessarily so since there may be learnable distributions for which there are no direct observations. However, a distribution can be inferred in the other cases and used to estimate the value of the adjustable parameter. In essence, this provides the basis for an Expectation Maximization (EM) style algorithm for simultaneously inferring distributions and estimating the learnable parameters.

Machine Learning can also be applied to conditional probability tables, not just to variables with simple prior distributions. Also, learnable distributions can be parameterized with variables just as any other logic term. For example, a rule rain(X,City)|season(X,City)=R(City) indicating that the probability distribution for rain depends on the season and varies by city.

All the elements described above have been implemented and tested, including pure logic and probabilistic logic predicates.

One of the simplest possible inference algorithms for Bayesian networks is the message passing algorithm known as loopy belief propagation first proposed by Judah Pearl [Reference #3 in the list of references]. The CBRS inference algorithm represents stochastic models as Markov fields rather than Bayesian networks by constructing a selective literal resolution system for definite clauses and then converting it into a Bayesian network.

The advantage of the CBRS approach is that the product distributions that arise from goals that unify with multiple heads can be handled in a completely natural way. The basic idea is that random variable nodes are generated as goals are found. Cluster nodes are created as goals are unified with rules. In constructing a Bayesian network, the node created corresponding to the clause in the head would be the child of the nodes corresponding to the clauses in the body. To construct a Markov field, CBRS adds a cluster node between the child and parents. If more than one rule unifies with the rule head, then the variable node is connected to more than one cluster node.

There are two kinds of nodes in these graphs; the variable and the cluster nodes. The variable nodes hold distributions for the random variables they define. The cluster nodes contain joint distributions over the variables to which they are linked. Messages between nodes are initially set randomly. On update, the messages provide relationships and other information about the distributions.

CBRS supports the representation of changes in state variables, constraints on state variable changes, and supports probabilistic variables as first class objects whose values represent probability distributions.

CBRS provides the high-level support needed for modeling cyber-physical systems including direct support for many kinds of uncertain processes such as Markov Decision Processes, Partially Observable Markov Decision Processes, Markov Chain Monte Carlo methods, and others. CBRS includes a machine learning algorithm and genetic algorithms for solving constraint satisfaction.

One CBRS innovation lies in its ability to collect, interpret, and react to data in dynamic environments in real time. Direct integration of predicate and probabilistic logic Modeling enables the development of cognitive, situation aware (SA) applications for cyber-physical systems. CBRS programs can be extended and enhanced with plug-in components written in other programming languages such as Prolog, Python, Java, C, and C++.

The CBRS runtime environment integrates predicate logic inference and Bayesian Approximate Inference (BAI). BAI supports modeling uncertain processes. BAI provides tractability for probabilistic reasoning that provides a "good enough" probabilistic solution that completes in linear time with respect to the number of data, assets, and paths. This probabilistic reasoning involves choosing feasible solutions based on evolving information, the availability of resources to handle the requirements and the response time, reliability, etc. of the assets.

The linear time BAI solution involves a Turing complete calculus for solving logic-switched equations. For BAI, the Bayesian logic is used iteratively to derive ever improving approximate solutions. The statistically accurate solution can be terminated according to hard deadline time constraints, where a true solution would possibly take minutes, hours or months to complete.

The BAI solution combines inductive, abductive and deductive logic in the reasoning of feasible solutions. In many cases, several solutions will meet the "soon enough" constraint. Deductive reasoning attempts to find feasible solutions directly. Abductive reasoning uses the contrapositive approach to find feasible solutions. In a chaotic environment with uncertainty and other problems, as the BAI solutions are generated, a momentary test may be used to estimate the statistical error bounds. If the estimate is within expectations, the solution can be used with assurance.

From a high-level perspective, CBRS programs work by searching over interpretations of data, information, and hypotheses, instead of a fixed library of models (probabilistic or predicate logic rules).

CBRS incorporates a library of schemas. Schemas are design patterns for constructing situation specific models that encode general domain knowledge about classes of objects, attributes, events, and their causal relationships. CBRS schemas are expressed in a Turing complete programming language that includes recursion.

CBRS employs a real-time model construction algorithm, in conjunction with probabilistic and predicate logic bases, to dynamically generate Situation Specific Models (SSMs) or Situation Specific Bayesian Models (SSBMs). The construction algorithm applies recent and current data to relevant schemas when data or context changes.

CBRS employs three cognitive levels of representation. At the top level, a flexible knowledge-base encodes a broad spectrum of knowledge applicable to a wide range of situations. This includes alternative situation-dependent schemas or methods for interpreting the data. At the middle level, interpretive schemas are selected and instantiated. Schema selection is based on the types of objects, relationships, and events detected in the current situation. The instantiated rules are then compiled into a graphical network for compact representation and fast inference. At the bottom level, the compiled network is applied to incoming data, providing simultaneous modeling and simulation (P&S), context-aware model switching, and autonomous model calibration.

CBRS supports multiple levels of data fusion. Level 0 fusion uses models to mine data from diverse sources. Level 1 fusion combines data to infer or simply declare information. Level 2 fusion uses models to combine information to infer or declare knowledge. These activities, while important, fall far short of understanding enabled by sense-making. Level 3 fusion, called "cognition", is required. Level 3 fusion distills knowledge into understanding in the bigger picture. Plus, understanding the uncertainty that exists at all levels of fusion is extremely important.

Rule and task execution states include: eligible to run; running; delayed; preempted; stopped; destroyed; and waiting.

Rule and model execution include, but is not limited to:
1) Rate monotonic scheduling
   a. Tasks run on a fixed schedule/period (e.g., 5 Hz, 1 Hz)
   b. High frequency tasks/rule sets have highest priority
   c. Slowest tasks run last in their time period
   d. Data moves through pipeline in lock step
2) Cooperative multi-tasking
   a. Tasks must "yield" to other tasks
   b. Fixed-rate tasks must complete within their allotted time
   c. Tasks that overrun their budget are reported
   d. Ensures all data is processed deterministically with respect to time
3) Multi-threaded tasks: Tasks run on their own virtual application threads, for example "blocking" tasks that can not yield such as tasks that perform input and output (I/O)

Tasks include, but are not limited to:
1) Rule Sets that execute continuously at a fixed rate and may be paused or blocked
2) Tasks and Rule Sets can be written in a language such as Python
3) Framework provides special purpose pre-defined tasks, i.e., a configurable task processing pipeline
4) Math (comparators, math functions, classifiers) such as timers, triggers, conditional variables, function generators, data loggers, message generators

BACKGROUND OF THE INVENTION

The current invention relates generally to automated cybersecurity methods of cyber-physical systems with respect to protecting sensitive data, personally identifiable information, protected health information, personal information, intellectual property, data, and governmental and industry information systems from unauthorized access, theft, or damage attempted by criminals and adversaries. Cybersecurity risk is increasing, driven by global connectivity and usage of cloud services, like Amazon and Microsoft web services, to store sensitive data and information. Successful cyber attacks and data breaches are on the rise due to widespread poor configuration of computing devices and cloud services paired with increasingly sophisticated cyber criminals.

Protecting information and cybersecurity have become so important that requirements for protecting data and information are promulgated by the US National Institute of Science and Technology (NIST) and are set out in NIST Special Publication 800 which is incorporated by reference as citation #listed as citation #19, 20, & 21 in the list of non-patent documents.

The background of the invention relates more specifically to the following documents which are incorporated by reference in the list of non-patent documents.

NIST SP 800-53 Security and Privacy Controls for Information Systems and Organizations, Revision 5 published Dec. 12, 2020 (incorporated by reference in the list of non-patent documents as citation #19), NIST SP 800-171, "Protecting Controlled Unclassified Information in Nonfederal Information Systems and Organizations," Revision 2 published Jan. 28, 2021, (incorporated by reference in the list of non-patent documents as citation #20), and NIST SP 800-213 "IoT Device Cybersecurity Guidance for the Federal Government: Establishing IoT Device Cybersecurity Requirements" Revision 0, Dec. 28, 2020, (incorporated by reference in the list of non-patent documents as citation #21).

The present invention is purposely architected to meet the NIST 800 requirements for information assurance and cross-domain security. With regard to patents, the United States Federal Guidelines for the NIST 800 SP state the use of an essential patent claim (one whose use would be required for compliance with the guidance or requirements of a NIST SP 800 publication) may be considered if technical reasons justify this approach. In such cases, a patent holder would have to agree to either a Royalty-Free or Royalty-Bearing license on terms which are Reasonable and Non-Discriminatory (RAND).

The present invention differentiates over prior art published by Luger (et al.) (which are incorporated by reference in the list of non-patent documents as citations #13 to 17), by utilizing self programming (autocoding) for instantiating, adapting and evolving stochastic models using machine learning, expectation maximization, and utility optimization, to accurately represent changing and evolving situations in real time. At the core of the current patent's architecture is a combination of formal predicate (discrete) and probabilistic logic used to encode sets of recursive relationships defining Dynamic Bayesian Models. In addition, the present invention includes Expectation Maximization (EM) parameter learning to calibrate models as well as to assess the quality of fit between the model and the data. "Model failure," detected as a poor fit between model and data, triggers a model repair mechanism based on causally informed context splitting and context merging.

The present invention differentiates over prior art by employing meta-structures that support the explicit characterization and manipulation of context to perform probabilistic diagnostic and prognostic analysis to manage the cybersecurity of complex distributed environments.

The present invention differentiates over prior hardware embodiments of artificial intelligence by the ability to perform learning by assimilation, whereby the processing is updated with the parameters of the existing network, which, in psychology, is similar to an individual incorporating novel events and objects into an existing way of thinking. During learning by assimilation, a contextualized repair mechanism reorganizes the model to accommodate new data. In human psychology, this is similar to an individual discovering new aspects of an environment that do not fit to his/her existing mental structures and, consequently, reorganizing these structures to incorporate this new information.

The present invention also differentiates from prior art by removing the restrictions of fixed programming, teaching dynamic command and control of algorithms, system components, and security measures in response to cyber threats and teaching probabilistic artificial intelligence that is based in a Turing Complete inference calculus and Bayes theorem. Said dynamic command and control programming can control other algorithms and their implementations (including, but not limited to, applications, operating systems, hypervisors, and/or hardware) for the purposes of defending and annealing against active and emerging security threats.

The present invention also differentiates from prior art by supporting model-based machine learning of model parameters and structure, by combining inference with deductive, abductive, and inductive logic.

The present invention also differentiates from prior art by utilizing layers of machine learning for dynamically adapting and evolving new stochastic models to accurately represent changing and evolving situations by activating a specific set of inferential strategies and focal points, such as the temporary focus on the causal role of a particular event, component, or subsystem state.

The present invention also differentiates from prior art by supporting autonomous generation of algorithms both predicate and Bayesian.

The present invention differentiates from prior art by implementing probabilistic approximation for linear time accurate solutions, i.e., time-to-solution=$n*k$ where n=the number variables and k=a constant amount of time.

The present invention also differentiates from prior art by representing and managing context shifts that support dynamic data interpretation utilizing inference-based learning for creating, adapting, and evolving new or improved stochastic models to accurately represent changing and evolving situations.

The present invention also differentiates over prior art by the use of inferential strategies and selective focus which serve to reduce the computational size of an estimation task in a probabilistic model by mitigating the need to continuously link local estimation tasks to probability updating over the entire world model with the ability to forget less relevant and/or older information and shift attention to significant aspects of the current data.

The present invention also differentiates over prior art by having autonomous dynamic modeling algorithms that supports reduction of the complexity of a constructed model as well as streamline the inference process by omitting the information from a knowledge base that is irrelevant to the current context, while constructing and maintaining its graphical model.

The present invention also differentiates from prior art by having an ability for representing as well as managing context shifts which supports dynamic data interpretation. Moreover, modeling a dramatically changing context across time can reflect deep changes in the complex internal structure of the model.

The present invention also differentiates by creating dynamic contexts in a probabilistic model with the ability to combine multiple "snapshot" models, i.e., those models that represent stationary or smoothly evolving stochastic processes. When the context evolves, the modeling algorithm of the present invention integrates aspects of other snapshot views of the current domain. This is useful for representing non-stationary processes with abrupt changes.

The present invention also differentiates over prior art by including a failure detection and recovery mechanism based on causal representations.

The present invention differentiates over prior art published by Baumann (incorporated by reference in the list of non-patent documents as citation #18), "The multikernel: A new OS architecture for scalable multicore systems" concerning a computing system, in which each core of a multi-core architecture is provided with a kernel comprising specific CPU driver and for each processor a monitor running on the CPU driver which are in particular responsible for the inter process communication setup. For the communication between the kernels, a shared memory is used. Having shared memory and inter-process communication teaches against requirements enforced by the US National Institute of Science and Technology (NIST) regulations NIST 800.53 and NIST 800.171 which are incorporated by reference in the list of non-patent documents in the list of published non-patent references as citations #19 and #20 respectively.

The present invention also differentiates and overcomes prior art by Gerhmann U.S. Pat. No. 8,713,567, which teaches shared memory and sharing of data of incompatible classifications. Gehrmann U.S. Pat. No. 8,713,567 goes against the NIST 800.53 and NIST 800.171 requirements for separate memories to protect data of incompatible classifications.

The present invention differentiates and improves on U.S. Pat. No. 10,922,149 to Peter which teaches "the communication module includes a shared memory, wherein each virtual machine is adapted to read from and write to the shared memory". Peter U.S. Pat. No. 10,922,149 goes against the NIST 800-53 and NIST 800-171 requirements that do not permit reading from and writing data of different security classifications to a shared memory The present invention does not teach or claim limitation of a communication module nor limitation of a read and write to shared memory.

The present invention differentiates and improves on U.S. Pat. No. 8,418,230 to Cornelius, et al. (listed in the list of US Patent Documents). U.S. Pat. No. 8,418,230 discloses an apparatus implemented using a single central processing unit (CPU) core wherein a virtual machine manager known as a 'hypervisor' executes on the single CPU core and provides three virtual machines within which a baseband processor, the communications management processor, and the application processor respectively execute. The present application differentiates and overcomes the limitation of U.S. Pat. No. 8,418,230 to Cornelius depending on a communications management processor.

The present invention differentiates over prior art by utilizing self programming (autocoding) for instantiating, adapting, and evolving stochastic models using machine learning, expectation maximization, and utility optimization to accurately represent changing and evolving situations in real time. At the core of this architecture is a form of probabilistic logic used to encode sets of recursive relationships defining Dynamic Bayesian Models. This logic is extended with a syntax for defining contextual restrictions on stochastic Horn clauses. In addition, the present invention includes Expectation Maximization (EM) parameter learning to calibrate models as well as to assess the quality of fit between the model and the data." "Model failure", detected as a poor fit between model and data, triggers a model repair mechanism based on causally informed context splitting and context merging. An implementation of this architecture for distributed weather monitoring is currently under development.

The present invention differentiates over prior art by employing meta-structures that support the explicit characterization and manipulation of context to perform diagnostic and prognostic analysis of complex distributed environments.

The present invention also differentiates from prior art by removing the restrictions of fixed programming and teaching probabilistic artificial intelligence to perform the cyber security functions.

The present invention also differentiates from prior art by supporting model-based machine learning of model parameters and structure using inference by deductive, abductive, and inductive logic.

The present invention also differentiates from prior art by utilizing layers of machine learning for adapting and evolving new stochastic models to accurately represent changing and evolving situations by activating a specific set of inferential strategies and focal points, such as the temporary focus on the causal role of a particular event, component, or subsystem state.

The present invention also differentiates from prior art by representing and managing context shifts that support dynamic data interpretation utilizing inference-based learning for creating, adapting, and evolving new or improved stochastic models to accurately represent changing and evolving situations.

The present invention also differentiates from prior art by having an ability for representing as well as managing context shifts which supports dynamic data interpretation. Moreover, modeling a dramatically changing context across time can reflect deep changes in the complex internal structure of the model.

The present invention also differentiates over prior art by the use of inferential strategies and selective focus which serve to reduce the computational size of an estimation task in a probabilistic model by mitigating the need to continuously link local estimation tasks to probability updating over the entire world model with the ability to forget less relevant and/or older information and shift attention to significant aspects of the current data.

The present invention also differentiates over prior art by having autonomous dynamic modeling algorithms that supports reduction of the complexity of a constructed model as well as streamline the inference process by omitting the information from a knowledge base that is irrelevant to the current context, while constructing and maintaining its graphical model.

The present invention also differentiates by creating dynamic contexts in a probabilistic model with the ability to combine multiple "snapshot" models, i.e., those models that represent stationary or smoothly evolving stochastic processes. When the context evolves, the modeling algorithm of the present invention integrates aspects of other snapshot views of the current domain. This is useful for representing non-stationary processes with abrupt changes.

The present invention also differentiates over prior art by including a failure detection and recovery mechanism based on causal representations.

A person of ordinary skill in the art of cyber security would appreciate and agree that more than one security classification (e.g. Level 1 and Level 2) of data processed by or generated by an application running in a single virtual machine is against the requirement that data of different security classifications must be physically separate and the virtual machines must not communicate directly with each other.

A person of ordinary skill in the art of cyber security would understand that per NIST SP 800, data of different levels of security classification must be stored in physically separate memory, and storing data at different levels (e.g., Level 1 and Level 2) in shared memory by virtual machines would compromise cyber security laws governing how data may be stored in volatile memory, while "at rest" (meaning stored in non-volatile memory), or "in transit" (meaning being conveyed between systems), if communicated.

A person familiar with cyber security would understand and appreciate that using a shared memory and a communication module for enabling of virtualization systems to communicate with each other teaches against NIST SP 800 requirements for physical separation of data stored in memory for each security classification.

BRIEF DESCRIPTION OF THE INVENTION

The present invention comprises: 1) a neuromorphic synthesizer which utilizes in its architecture a combination of analog signal processing as well as hardcore or softcore processors instantiated in a "bare metal" substrate. The synthesizer implements the Bayesian Inference Calculus describe herein. Each processor having a kernel that executes at a privilege level lower than the highest privilege level cooperatively coupled to a hypervisor that operates under control of the microvisor to provide trusted processing in multiple virtual machines with a contextual mechanism is incorporated in a failure-driven probabilistic modeling system.

Advantages Over Prior Art

There are several specific issues in order for the pseudo-code to be successfully implemented. The main issues are to rigorously define the notion of a context using causal models, and to specify what it means for a system or its cyber security defenses to break down. Precise methods for learning the causal structures from the data are also needed. Moreover, intuitively, we can see that the no failure( ) (00xxnofailure) predicate also depends on the ability to learn causal models from data. Note that the algorithm implicitly assumes high efficiency of the update functions get_updated_net( ) and get_updated_kb( ), due to the high amount of consecutive inner loops in the execution of the system.

Dynamic logic-based probabilistic modeling with an agent has several advantages over prior art. First, modeling context reduces the size of the resulting graphical model. This reduction improves the efficiency of inferencing across the model, which is especially crucial in modeling dynamically changing systems. The second advantage is the ability to handle non-stationarity in the data. Intuitively, we can see a complex non-stationary stochastic process that underlies data as a composition of simpler stationary or slowly evolving processes and modeling context represents the switching between the "snapshot" models that correspond to these simpler stochastic processes.

Another advantage over prior art is the use of identification of a strong connection between causal relationships and context with contextualized mechanisms that support causality that can capture and simplify the regularities underlying sets of data.

Another advantage is that the probabilistic graphical model identifies and utilizes causal structure to "explain" the events as supported by the data.

Yet another advantage is that context is used to filter out irrelevant information while reorganizing a current model; similarly, humans ignore redundant and irrelevant information when updating or rebuilding their internal knowledge of situations.

Yet another advantage over prior art is the ability to do model construction, parameter estimation, learning and solving models with recursive (feedback) loops.

Yet another advantage of our invention is that it applies the principles of learning through assimilation and accommodation together with the notion of context and proposes our architecture for failure-driven and event-oriented stochastic modeling.

DETAILED DESCRIPTION OF THE INVENTION

The following is a detailed description describing exemplary embodiments to illustrate the principles of the invention. The embodiments are provided to illustrate aspects of the invention, but the invention is not limited to any embodiment. The scope of the invention encompasses numerous alternatives, modifications, and equivalent; it is limited only by the claims.

Numerous specific details set forth in the figures and descriptions are provided in order to provide a thorough understanding of the invention and how to practice the invention. However, the invention may be practiced according to the claims without some or all of these specific details. For the purpose of clarity, technical material that is known in the technical fields related to the invention has not been described in detail so that the invention is not unnecessarily obscured.

A formal description of the calculus of our invention is reflected in the following pseudo-code:
1 KB=InitKB, Context=InitContext
2 (Net,Map)=_kbmc(KB,Context,Queries)
3 repeat_until(no data received)
3.1 Data=receive( )
3.2 if(_no_failure(Net,Data)) then
3.2.1 Net=_get_updated_net(Net,Data)
3.2.2 KB=_get_updated_kb(KB,Map,Net)
3.3 else
3.3.1 Context=_get_new_context(Net,Data)
3.3.2 SimilarModel=get_similar_model(Context,KB)
3.3.3 if(_is_null(SimilarModel)) then
3.3.3.1 (Net,Map)=_kbmc(KB,Context,Queries)
3.3.4 else
3.3.4.1 (Net,Map)=SimilarContext
3.3.5 Net=_get_updated_net(Net,Data)
3.3.6 KB=_get_updated_kb(KB,Map,Net)

For example, we use an explicit context to switch between local representations, probabilistic models that represent locally stationary processes. We illustrate this statement with the following example.

Suppose there is a burglar alarm installed with remote communication guarding someone's residence. Suddenly, the owner receives a message that the alarm has been triggered. The homeowners want to take action immediately to mitigate the potential threat to their lives and property. To determine the appropriate course of action, we begin by computing the probability that the owner's home has, in fact, been burglarized as opposed to a false alarm. In this example let us assume that the system was produced and sold exclusively in Albuquerque, New Mexico. Given that the alarm system was used by customers in Albuquerque, the local police department recorded the data when the alarm went off and when the residence with the installed alarm was actually burglarized. Using a declarative language representation, we add the following sentence to the knowledge base (KB): alarm(x)|burglary(x)=L.

This sentence shows that the event that the alarm goes off is conditionally dependent on the event that the residence was burglarized, where the conditional probability distribution is unknown (L). In our system, the rules of the KB are mapped into a Markov network and then, after inferencing, the KB is updated with the facts: alarm(x) burglary(x)=[9, 0.1, 0.001, 0.999] which indicates that the alarm goes off in 90% of the cases involving a burglary, and if the alarm does not go off, 99.9% of the time there was no burglary evident. The homeowners can use this information to determine their course of action. It is important to note that this information is learned from the data from Albuquerque where the information is relevant to Albuquerque homeowners' analysis and threat mitigation. As far as the homeowners are concerned, the KB represents the whole world; however, the place location might be relevant to the false alarm rates and subsequent course of action taken.

Now let us extend the example. Assume the company starts selling its alarm system in Los Angeles, California (L.A.), hence the police database expands with new data tuples obtained from LA. Note that the distribution of the data from LA is very different from that of Albuquerque, because there may be many more false positives or negatives in the Los Angeles data. Because of that, the graphical model created with Albuquerque data does not fit the data from LA. Consequently, we need to reorganize the model in order to account for the new data that do not fit the existing structure of the model. In this example we see that by splitting the rule on cases depending on location gives a better predictor.

CBRS can distinguish contexts corresponding to Albuquerque and Los Angeles, and as a result, formulate that the original rule is split using these two contexts. The rule for Albuquerque stays the same as the original one, but the rule for LA is an unknown distribution, which can be learned using parameter estimation as was shown above. As the result, the structure of the KB is changed and its distributions are updated:

alarm|burglary=[0.9, 0.1, 0.001, 0.999] Albuquerque
alarm|burglary=[0.9, 0.1, 0.1, 0.9] LosAngeles.

For these rules, the notation represents a context as a predicate after the symbol. The context distinguishes two cases; Albuquerque and Los Angeles, each of which corresponds to a separate Markov network.

Since splitting on the location parameter was successful when the company expanded to L.A., we can do the same again when the alarm company goes to Moscow, Russia. The new data from Moscow is used separately for this new location distribution. This approach is inspired in developmental learning: an individual learns a strategy that works and then uses it, until it stops working, in which case the individual will have to then learn a new strategy. The technique described here we call context splitting.

We expand our burglar alarm example even further and assume that eventually the company grows very large and has many different retail locations. Consequently, the corresponding modeling system contains the KB with contexts. There are many ways to determine which attributes of the database to use for context splitting. A simple way is to iterate across the attributes of the table and find which attribute partitions the distribution such that we get the maximum information gain.

The corresponding rules can be generalized with some higher-level comprehension in a technique we call context merging. Models can be extended to incorporate real time information about the current crime conditions, for example. When evidence suggests that criminals are more active, the probability of a true positive may increase. This generalization extends to cyber security models.

Intuitively, context merging can be supported by a form of causal reasoning. It might be observed in the KB that in San Diego, L.A., Tokyo, and San Francisco, the frequency of a burglary being associated with a triggered alarm is lower when criminal activity in the area is observed to be low, hence, it is possible to reason that there must be another cause for the alarm to go off Consequently, the new cause simply gets a new name, say foo. Later, if needed, a user can provide a better name and the explanation for this phenomenon.

Note that this is the way CBRS learns latent variables: the systems suggest correlations, that is, that there is a latent relationship (a possible meaning for the hidden parameter), and then a human comes and identifies the relationship (being in an earthquake zone, in our example). We discuss the connection between the notion of context and causality in a later section.

Suppose that it can be determined that the distributions corresponding to San Diego, L.A., and San Francisco have similar properties. Consequently, these three rules can be generalized into one with a context California. If there is another location, Tokyo for instance, we might detect that the distributions for California and Tokyo are also very similar. The generalization may also be based on other coexists; for example, property crime is known to be correlated to illegal drug activity, so the data may be correlated to drug related arrests in the police database at the time that an alarm occurs.

Context can be used to granulate the overall representation of a problem into a set of finer modeling tasks, such that depending on the current task, the size of a resulting model is much smaller than that of a general model that tries to incorporate all the knowledge. Hence, the inference on contextualized models is faster because they are more lightweight, i.e., they contain less information that proves to be irrelevant to the current task. Besides being able to efficiently manipulate with context, CBRS addresses another important issue of how to construct a relatively simple model containing only relevant information. Since the system proposed in this paper uses a knowledge-based model construction technique, one solution is to use context to filter which rules of the KB are relevant in the current situation.

A somewhat similar approach to our approach was proposed by (Ngo & Haddawy 1997). They used simple predicates to identify the relevant subset of a KB, thus producing only a rough approximation of the relevant knowledge. Note that we are willing to spend more computational resources on constructing a tight relevant graphical model corresponding to a current task, as long as the consequent reasoning across the constructed network is efficient. For instance, in the probabilistic modeling system of an airplane, it is reasonable to invest several seconds into reorganizing a current model when a plane flies into a turbulence zone, if the inferencing on the resulting model will then take milliseconds.

In order to successfully operate with context (perform context splitting and merging) and, as a result, obtain smaller and more relevant models, a clear definition of context must be provided. In the burglary alarm example above, the system splits on context when new data does not fit in a current model as if a so-far-stationary underlying stochastic process presents non-stationary behavior. CBRS identifies this situation via a failure of the system to incorporate new data into its current model.

Failure is syntactically straight forward to calculate, for example, by monitoring the changes of a model's distributions across time. It is also possible to set triggers that either inform the model's observers, or better, ask the model to recalibrate its current context as it processes newly arriving data. Semantically defined calls for model recalibration are another matter altogether, perhaps left to the a priori concerns of the human user or results from previous modeling activity.

The CBRS context-based model tries to adapt to abrupt changes it encounters by reorganizing its model. In a failure situation, indicated by a significant shift in the internal structure of the data, the model's new structure is captured through the definition of a new context. Intuitively, this is achieved using causal meta-structures across the components of the model. CBRS uses structural equations to describe causal relations in the definition of context. Additionally, defining the context via causality enables context merging to be done using causal reasoning. Recall, in the burglary alarm example, the situation of merging the models corresponding to San Diego, Los Angeles, and San Francisco. It is possible to reason that there must be another cause for the alarm to go off in these three cities, because we observe that the frequency of a burglary being associated with a triggered alarm is lower. As a result, we identify the new unknown cause as foo, and later as Earthquake-Zone.

Reduction to Practice

The reduction to practice of the current invention included porting of CBRS to a suitable processor that supports virtual machines enabling multiple reasoning applications to form and operate simultaneously.

In reduction to practice, a schema-based prototype system was developed with several models to analyze physical site security data taken from multiple distributed sensors (e.g., visible spectrum and infra red cameras).

During reduction to practice, the probabilistic logic and inference was implemented with the Loopy Logic language developed by Dan Pless in his doctoral thesis (incorporated by reference in the list of non-patent documents as citation #1).

During reduction to practice, we implemented our invention using a self-programmable logic array having four softcore processors each instantiated with the CBRS operating system. We tested it in standard domains such as Bayesian Belief Networks and Hidden Markov Models. Although the tests were on specific sensor inputs, we evaluated the full functionality of the language and self-programming logic including its ability to do model construction, parameter estimation, learning and solving models with recursive (feedback) loops. We demonstrated CBRS identifying multiple security intrusion events and controlling hardware and software to mitigate and anneal against the intrusion.

At the current time, there are a microprocessors constructed with hardcores configured in the bare metal circuitry and softcores that are defined by software that are loaded into programmable logic, such as a field programmable gate array (FPGA). The hardcore and softcore processors underlay a custom Operating System (OS) such as, but not limited to, Microsoft Windows OS, Google Chrome OS, and Linux OS. While the hardcores and softcores are trusted, there have been and continue to be, numerous upgrades to the OSs to overcome faulty software construction. The fixed nature of the rules and procedures of these OS lack the ability to perform inductive, deductive, and abductive logic in combination with inference-based probabilistic model-based causal reasoning that are the cornerstones of cognitive intelligence. Accordingly, there is a need for an enhanced system with cognitive reasoning that operates at the bare metal to mimic human probabilistic reasoning.

There are several specific issues that need further clarification in order for the pseudo-code to be successfully implemented. The main issues are to rigorously define the notion of a context using causal models, and to specify what it means for a system to break down. Precise methods for learning the causal structures from the data are also needed. Moreover, intuitively, we can see that the no failure( ) predicate also depends on the ability to learn causal models from data. Note that the algorithm implicitly assumes high efficiency of the update functions (get updated net( ), get updated kb( )), due to the high amount of consecutive inner loops in the execution of the system.

DETAILED DESCRIPTION OF THE INVENTION

A synthesizer built in accordance with the present invention has less complexity, includes training enhanced algorithms, and offers more functional flexibility than prior art. A synthesizer designed in accordance with the invention includes a significant improvement in functionality and design over prior art, such as taught in U.S. Pat. No. 6,938,177, referenced herein, does not teach to computing devices with artificial intelligence in combination with microvisors or hypervisors to protect programs and data from malicious attack.

The present invention improves prior art by teaching protection of data and programs in computing devices from unintended access by using freely re-configurable and separately programmable circuits to form a multi-purpose system with dynamic reasoning synthesized in real time which run independently or dependently on a hardcore processor or a softcore processor.

Detailed Description of the Hardware

In one embodiment, an application filters data according to prioritized rules and subsequently scrambles the filtered data with an encryption algorithm approved for the security classification. In a second embodiment, a software application is terminated in response to an inferred change in system state. In a third embodiment, a "dry contact switch" is closed in response to a detected threat, changing the physical characteristics of the system.

The present invention incorporates a tightly coupled reasoning machine which uniquely combines a bootloader, interconnects and functions patterned in an overlay of substrates with at least one algorithm synthesizer, and at least one rule processor with a feature to recognize changes in structure of algorithms and processes.

The present invention is a synthesizer with capabilities for understanding and characterizing context which is critical for modeling both analog and digital data and combinations thereof. The understanding and characterizing of context can mediate the interpretation of highly complex data by activating a specific set of inferential strategies and focal points, such as the temporary focus on the causal role of a particular component or subsystem state.

Detailed Description of the Software

The following paragraphs detail the CBRS dynamic reasoning software. The CBRS dynamic reasoning software toolset is a powerful and flexible unified modeling toolkit, runtime environment, and methodology for modeling and controlling cyber-physical systems in real time.

The CBRS Rules Engine dynamic reasoning software facilitates the construction of high level descriptions and models describing the composition and behavior of cyber-physical systems, including the development of code to control such systems and to solve planning and response problems involving them.

CBRS supports the representation of changes in state variables, constraints on state variable changes, and supports probabilistic variables as first class objects whose values represent probability distributions. This integration provides the high-level support needed for modeling threats to cyber-physical systems and applications and the control actions necessary to mitigate such threats and anneal the system, including direct support for many kinds of uncertain processes such as Markov Decision Processes, Partially Observable Markov Decision Processes, Markov Chain Monte Carlo methods, and others. CBRS includes a machine learning algorithm and genetic algorithms for solving constraint satisfaction.

CBRS employs three cognitive levels of representation. At the top level, a flexible knowledge-base encodes a broad spectrum of knowledge applicable to a wide range of situations. This includes alternative situation-dependent schemas or methods for interpreting the data. At the middle level, interpretive schemas are selected and instantiated. Schema selection is based on the types of objects, relationships, and events detected in the current situation. The instantiated rules are then compiled into a graphical network for compact representation and fast inference. At the bottom level, the compiled network is applied to incoming data, providing simultaneous modeling and simulation (M&S), context-aware model switching, and autonomous model calibration.

CBRS supports multiple levels of data fusion. Level 0 fusion uses models to mine data from diverse sources. Level 1 fusion combines data to infer or simply declare information. Level 2 fusion uses models to combine information to infer or declare knowledge. These activities, while important, fall far short of understanding enabled by sense making. Level 3 fusion, called "cognition", is required. Level 3 fusion distills knowledge into understanding in the bigger picture.

The following paragraphs detail the CBRS Rules Engine. The CBRS Rules Engine and associated runtime integrates predicate logic inference and Bayesian Approximate Inference (BAI). BAI supports modeling uncertain processes. BAI provides the Rules Engine with tractability for probabilistic reasoning that provides a "good enough" probabilistic solution that completes in linear time with respect to the number of datum, assets, and paths. CBRS Rules Engine probabilistic reasoning involves choosing feasible solutions based on evolving information, the availability of resources to handle the requirements and the response time, reliability, etc. of the assets. The linear time BAI solution involves a Turing complete calculus for solving logic switched equations. For BAI, the Bayesian logic is used iteratively to derive ever improving approximate solutions. The statistically accurate solution can be terminated according to hard deadline time constraints, where a true solution would possible take minutes, hours or months to complete.

The CBRS Rules Engine combines inductive, abductive and deductive logic in the reasoning of feasible solutions. In many cases, several solutions will meet the "soon enough" constraint. Deductive reasoning attempts to find feasible solutions directly. Abductive reasoning uses the contrapositive approach to find feasible solutions. In a chaotic cyber-attack environment with uncertainty and other problems, as the CBRS solutions are generated, a momentary test can be used to estimate the statistical error bounds. If the estimate is within expectations, the solution can be used with assurance.

From a high-level perspective, the CBRS Rules Engine works by searching over interpretations of data, information, and hypotheses. Instead of a fixed library of models (probabilistic or predicate logic rules), CBRS incorporates a library of schemas. Schemas are design patterns for constructing situation-specific models that encode general domain knowledge about classes of objects, attributes, events, and their causal relationships. CBRS schemas are expressed in a Turing complete programming language that includes recursion.

The CBRS Rules Engine employs a real-time model construction algorithm, in conjunction with probabilistic and predicate logic bases, to dynamically generate and process Situation Specific Models (SSMs) or Situation Specific Bayesian Models (SSBMs). The construction algorithm applies recent and current data to relevant schemas when data or context changes.

The following paragraph details the embedded runtime software for data processing, recording, and model execution. The CBRS Rules Engine embedded runtime consists of the Rules Engine application binary, dynamic libraries, models, machine learning algorithms, drivers for data ingress and egress, and supporting software libraries for processing and classification including filters, neural networks, classifiers, etc.

The following paragraph details the system specific device drivers. System specific device drivers provide an interface between the CBRS Rules Engine and cyber physical system components such as analog to digital converters (ADCs), network interfaces, and general-purpose input/output pins (GPIO).

Communications Interfaces
Inter-process communications
Websocket interface for HTML5 apps (graphs, charts) and mobile app clients A formal example of the CBRS operating system is reflected in the following pseudo-code:

```
1 KB=InitKB, Context=InitContext
2 (Net,Map)=_kbmc(KB,Context,Queries)
3 repeat_until(no data received)
3.1 Data=_receive( )
3.2 if(_no_failure(Net,Data)) then
3.2.1 Net=_get_updated_net(Net,Data)
3.2.2 KB=_get_updated_kb(KB,Map,Net)
3.3 else
3.3.1 Context=_get_new_context(Net,Data)
3.3.2 SimilarModel=get_similar_model(Context,KB)
3.3.3 if(_is_null(SimilarModel)) then
3.3.3.1 (Net,Map)=_kbmc(KB,Context,Queries)
3.3.4 else
3.3.4.1 (Net,Map)=SimilarContext
3.3.5 Net=_get_updated_net(Net,Data)
3.3.6 KB=_get_updated_kb(KB,Map,Net)
```

In CBRS, the use of inferential strategies and selective focus serve as means to reduce the computational size of an estimation task in a probabilistic model by mitigating the need to continuously link local estimation tasks to probability updating over the entire world model.

In CBRS, the notion of context plays a major role for reorganizing a current instantiation to achieve non-stationary probabilistic modeling and introduce contextual mechanisms, such as context splitting and context merging.

Modeling context enables the ability to forget less relevant and/or older information and shift attention to significant aspects of the current data. Moreover, while modeling a dramatically changing world, transforming context across time can reflect deep changes in the complex internal structure of the world model. Our probabilistic modeling architecture supports these and other aspects of context revision.

As the size of the resulting network grows large, it becomes time consuming and cumbersome to manipulate, and the inference algorithm can take an exponentially longer time to finish probability updating. Thus, a primary reason for representing contexts dynamically is to reduce the complexity of the constructed model and, consequently, to streamline the inference process.

CBRS reduces the complexity of the constructed models in an evolving context by omitting information from the relevant knowledge base that is irrelevant to the current task, while constructing and maintaining its model.

An important reason for creating dynamic contexts in a probabilistic modeling synthesizer is the ability to combine multiple "snapshot" models—those models that represent stationary or smoothly-evolving stochastic processes. One can think of a single context as a snapshot model; when the context evolves, the modeling system integrates aspects of other snapshot views of the domain. This is useful for representing non-stationary processes with abrupt changes. Moreover, our causal reasoning architecture includes failure detection and recovery mechanisms based on causal representations. By employing meta-structures, the architecture may support the explicit characterization and manipulation of context to perform diagnostic and prognostic analysis of complex distributed environments.

CBRS includes two integrated kinds of logic modeling languages, their editors, graphical tools for visualizing relationships in models, compilers, and a runtime environment suitable for virtual applications.

The CBRS top layer has a contextual mechanism incorporated in a failure-driven probabilistic modeling system that controls knowledge-based model construction (KBMC).

In a preferred embodiment, the non-volatile data storage allows for date and time stamping of the data with the digital value provided by an accurate internal clock. Accordingly, the digital output from the real-time date/time clock can be used to provide accurate date-time stamping of data.

Preferred Embodiment

In a preferred embodiment, the current invention comprises at least one bare metal processor that supports at least the following types of functionality:
a) virtual machine partitions;
b) loading of executable programs and data from both external sources and from memory;
c) multi-level security algorithms;
d) cognitive reasoning with dynamic models to provide plasticity;
e) artificial intelligence algorithms to provide cybersecurity;
f) programmable description of situation-specific contexts;
g) memory for storage of configuration information for setting properties of functional units;
h) real time clock to provide data for time stamping;
i) computer language for the construction of high-level descriptions and models describing the composition and behavior of cyber-physical systems, including the development of code to control such systems and to solve planning problems involving them.

In a preferred embodiment, the present invention supports at least the following types of functionality:
j) Turing machine with virtual machine partitions;
k) loading of executable programs and data from both external sources and from memory (17);
l) multi-level security algorithms;
m) plasticity;
n) artificial intelligence algorithms to monitor for cyber-attack;
o) programmable description of situation-specific contexts;
p) memory (17) for storage of configuration information for setting properties of functional units;
q) real time clock (xx) to provide data for time stamping.
r) computer language for the construction of high-level descriptions and models describing the composition and behavior of cyber-physical systems, including the development of code to control such systems and to solve planning problems involving them.

In a preferred embodiment, the present invention further includes a resettable digital real-time clock for accurate date and timestamping of recorded data. The date and time stamping may also be used for non-recorded data which, for example, would be used to detect changes in time of execution and events which could be evidence of a cyber-attack or malicious code.

The present invention utilizes independently operable and programmable plasticities which may be used to implement many of the key functions including the AI functions.

In a preferred embodiment, the plasticity may be programmed to operate either under control of the processor (for example as a co-processor) or, can be programmed to operate both independently or collaboratively with other plasticities. For example, a plasticity may be performing signal processing while acting as a switching means to select and route analog or digital signals while performing reasoning, signal conditioning, and filtering at the same time. This can be extended to re-route connection of external sources and connectivity conductors in the embodiment, whether power-bearing or signal-bearing. The power to the plasticity can be switched off to consume no power during sleep and restarted by the external signal or by the processor program when the processor is reactivated.

The CBRS can be programmed to monitor the functionality of constituents of the synthesizer such as, but not limited to, the processor, the plasticity, the analog-to-digital conversion operations, and the digital-to-analog conversion operations. Alternatively, the microvisor can be used to perform built-in self-test functions.

The plasticities utilized in a preferred embodiment of the present invention have the ability to be reprogrammed from non-volatile memory. This enables the parallel activities of the plasticity to be dynamically constructed and personalized with a variety of unique programs and data, such as serial codes, calibration coefficients, test programs, or process history. Accordingly, the present invention has the ability to be dynamically configured as a processor with extended mathematical or logical precision.

In a preferred embodiment, the plasticity and the processor are preferably coupled to volatile and non-volatile memory components for storage of algorithms and data and are preferably configured to receive a plurality of analog and digital inputs and produce a plethora of digital and analog outputs. The preferred embodiment may use the parallel processing capability to re-route a subset of its external interconnections through the use of switch logic. Additionally, the memory components may provide a source of digital values for creating dynamic encryption, and processes, "on the fly".

Preferably, the plasticity would be configured in numerous gate array patterns. Additionally, switching using the plasticity is far superior to prewired solid-state switches for near-static reconfiguration of digital and analog signal lines. Using the plasticity, the present invention is endowed with important capabilities, including a source of digital values that may be used in generating encryption keys "on the fly".

In a preened embodiment, the present invention encrypts the data continuously into a secure sector and zeroizes by overwriting the originating memory locations of the encrypted data.

Applications and Functionality

A person of ordinary skill in the art would appreciate the present invention can be applied and/or used in numerous situations requiring secure processing. Such situations, for example, include protection of multiple levels of sensitive data in communication systems, computers, cellular phones, modems, motor controllers, instrumentation, health and status monitoring systems, monitoring systems for quality control, configuration management processors, perimeter and internal security systems, miniature computers, embedded computers, and engine control. The invention may also be used for cyber-secure credit card processors, wearable computers, and/or data recorders.

A person of ordinary skill in the art would appreciate that the inclusion of the microvisor, hypervisor, artificial intelligence operating systems, and plasticity of the present invention provides a simultaneous parallel processing capability with cybersecurity that can be implemented as a neuromorphic computer or coprocessor.

A person of ordinary skill in the art would appreciate that the present invention can also be designed especially for managing multiple types of sensors including digital, discrete, and continuous.

The foregoing description details certain preferred embodiments of the present invention and describes the best mode contemplated. It will be appreciated, however, that the invention can be practiced in many ways and is not intended to be limited or restricted in any fashion except as defined in the claims which follow, and any equivalents thereto.

Reduction to Practice

The present invention was reduced to practice by producing an electronic module that included a combination of a commercial microprocessor and a commercial field programmable gate array, (Xilinx Zynq product). The Zynq has four soft core processors used for CPU instructions that support virtual machines that can run independently with the CBRS operating system as well as large volatile and non-volatile memories, a real time clock, multiple oscillators that produce high and low clock frequencies, a programmable analog to digital converter that is serially multiplexed over the individual or multiple input channels and a programmable digital to analog converter to produce output voltages.

The CBRS system of the present invention was reduced to practice using C++, Java, and Python. The CBRS was implemented with a Rules Engine as a general framework for processing data with a Rules Set. Rules were scripted for managing the FPGA interface with data sources; Ethernet communication; and a data pipeline to move data through system. Rules were scripted to perform, data acquisition, smoothing, filtering, frequency/time transformation, classifiers, and neural networks. CBRS was supported by interfaces to external processes produced with Python, C/C++, and Java; and Linkable libraries (Application Program Interfaces are also known as API).

On boot-up, the CBRS loaded the Rules Engine which processed the security Rule Set to provide protection from unauthorized access to data and software programs in the multiple virtual machines. Next, the Rules Engine loaded the Active Rule Set which guided the next Operating System actions.

The commercial processor further included an autonomous startup capability on activation allowing operation without need for control of an internal or external clock. This means the present invention can function with discontinuous applied power whereas prior art can only go into a sleep mode that requires power to the internal capacitive oscillating circuit. This also means the embodiment is able to display history-dependent behavior and be put to zero-power sleep for extended periods of time to be awakened by application of power from another device. This also means the invention can turn itself off completely allowing for wakeup on activation by the next input of power (e.g., from solar energy).

Along with its increased functionality and unique design, the primary characteristics of the present invention as reduced to practice are its compact size, light weight, low power consumption, and compatibility with robust application regimes.

REFERENCE TO NUMERALS USED IN DRAWINGS

Apparatus 1
Bare metal processor 2
Virtual machine managing means 3
Hardware assets 4
Software applications 5
Programmable logic 6
Memory 7
Software assets 8
Virtual machine 9
Turing complete calculus 10
Security domain 11
Microvisor code 12
Embedded read-only memory 13
Digital data 80
Time data 92
Metadata 93
Queries 94
Commands 98
CBRS 100
Rules engine 200
Initiation at system start or reset 201
Compiled rules reader 202
Memory table means 203

Configuration driver(s) means 204
Autonomous task means 205
Process Loop means 206
Data is available 207
Pipelining task parameters 208
Starting scheduled tasks 209
Interrupt handling means 210
Interrupt clearing means 211
Interrupt assertion means 212
Event handling means 213
Shutdown means 214
Artificial intelligence 300
Schema librarian means 301
Model librarian means 302
Data sourcing means 303
Bayesian configuration management means 304
Situation specific inference means 305
Dynamic data fusion means 306
Security reasoning means 307
Deductive reasoning means 309
Abductive reasoning means 310
Inductive data means 311
Current schema 312
Current logic 313
Live data 314
Bayesian model 315
Fusion output 316
Security messages 317
Threats alerts 318
Managing data 400
Diagnosing 500
Predicting 600
Cybersecurity 700
Applications 800
Rule processing means 20601
Rule planning means 20602
Rule scheduler means 20603
Rule set supervisor means 20604
Task execution means 20605
Logistics means 20606
Short-wait resource means 20607
Long-wait resource means 20608
Modeling means 20609
Rules engine cyber security means 20610
Pause rule execution command 20611
Start rule execution command 20612
Tasks completed message 20613
System data 30401
World data 30402
CBRS model means 30403
Successful update 30404
Knowledge base means 30405
Failure to update 30406
New causal model 30407
Context means 30408
Model construction means 30409
Knowledge base 30410

A BRIEF DESCRIPTION OF THE DRAWINGS

Figure 2:
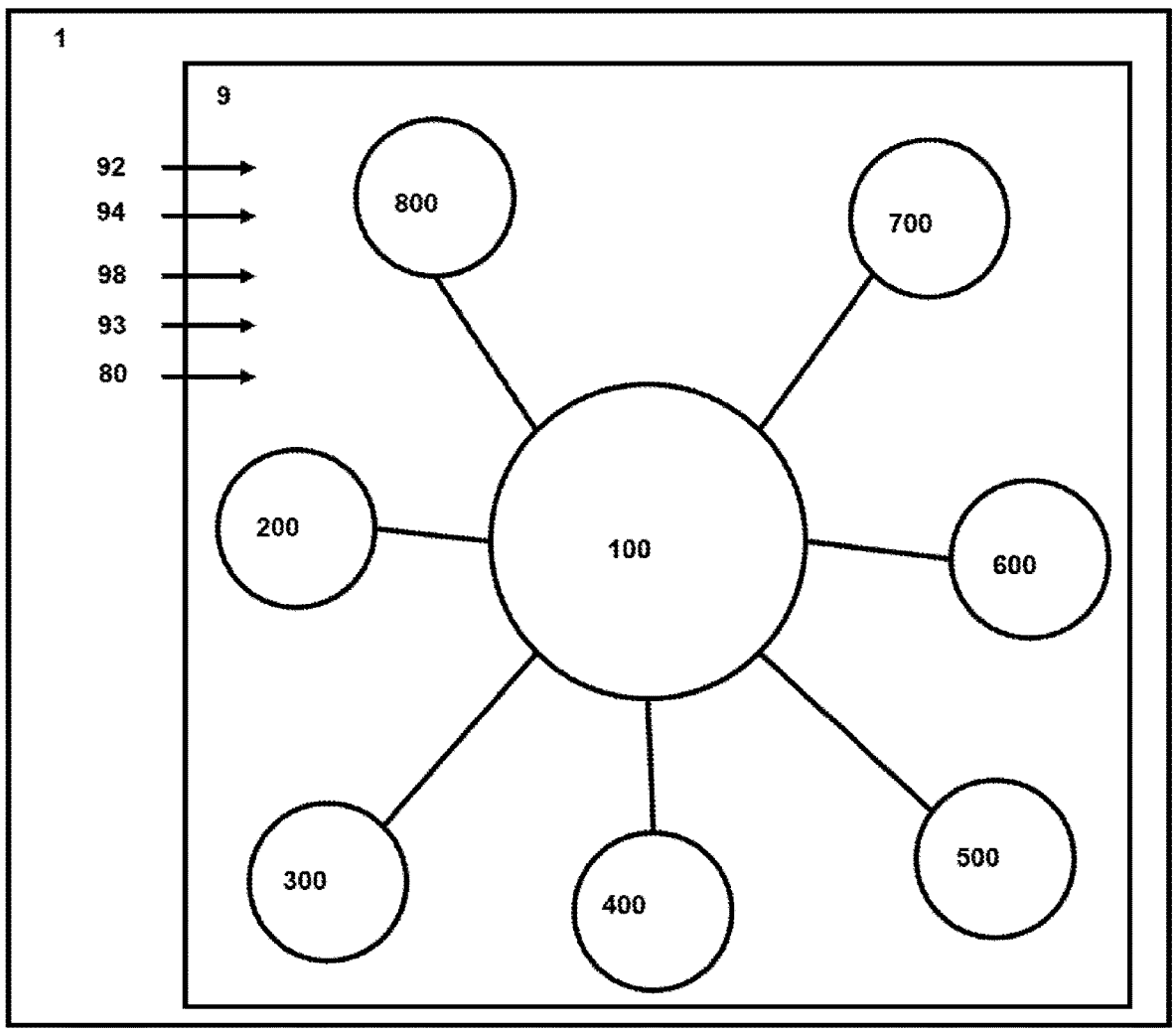
Figure 3:
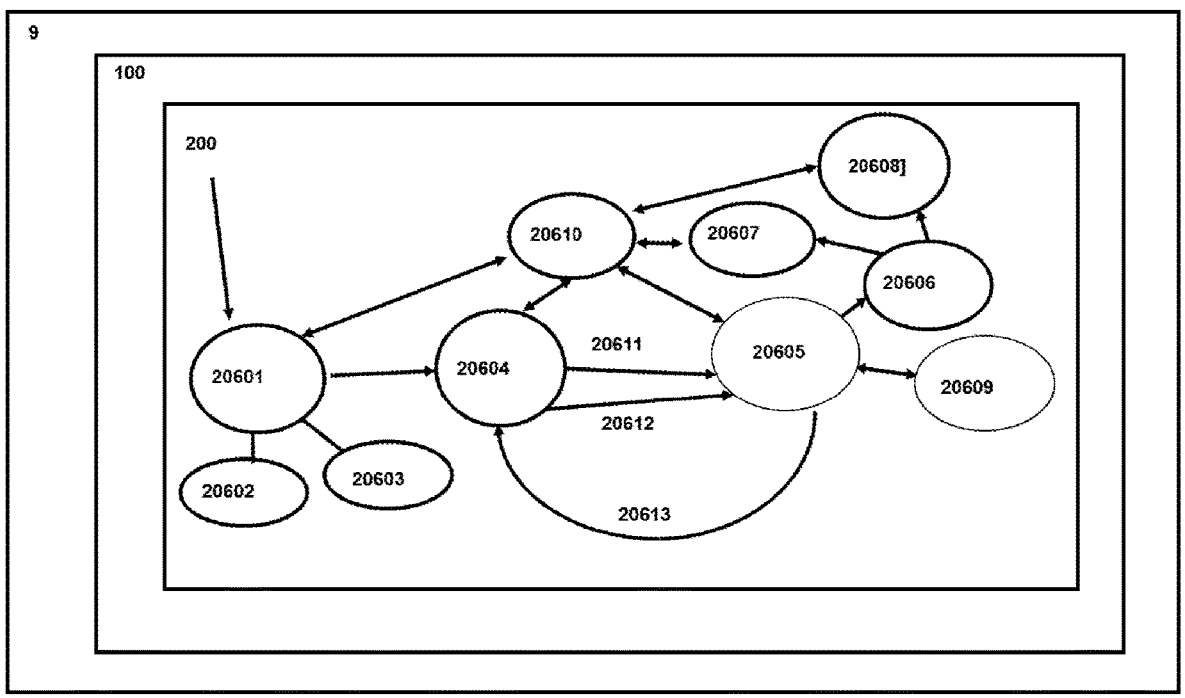
Figure 4:
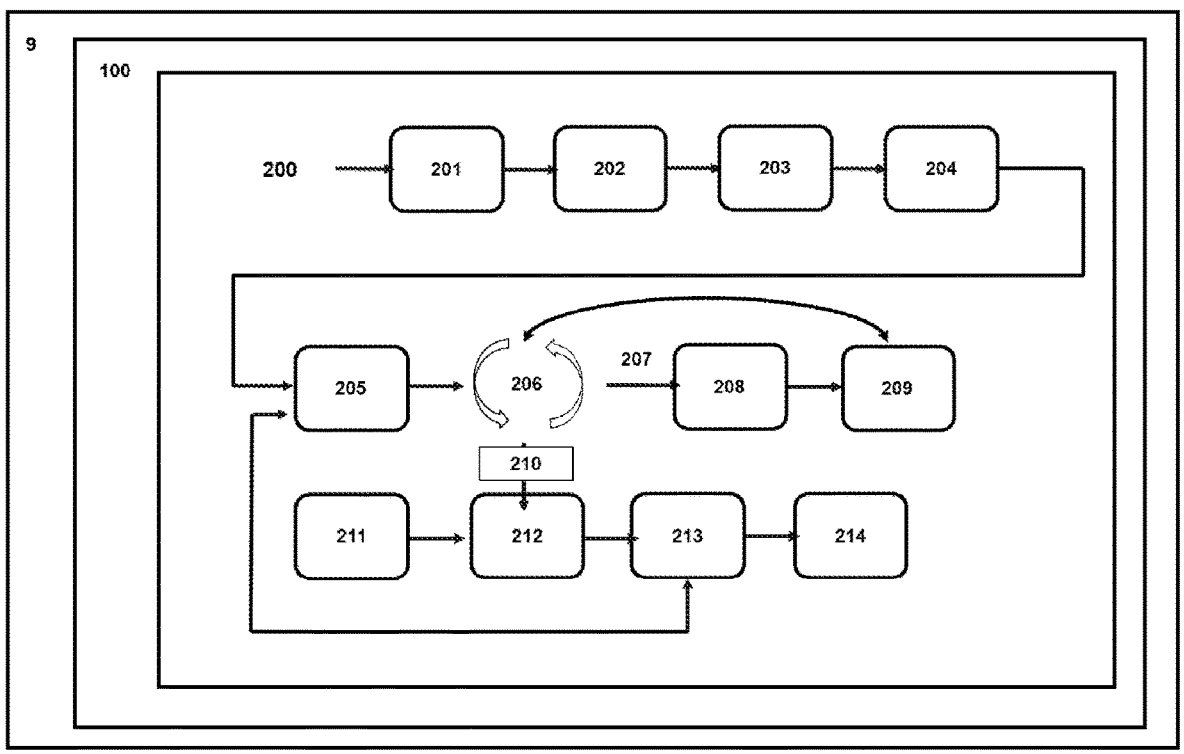
Figure 5:
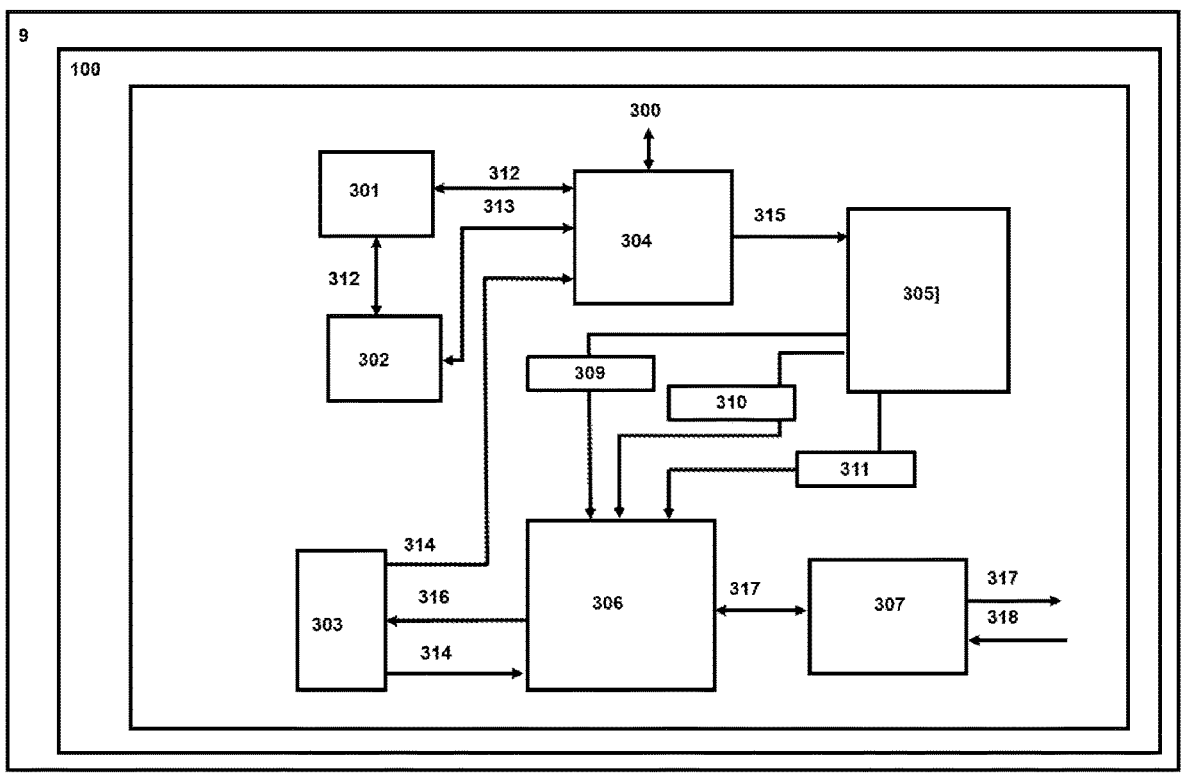
Figure 6:
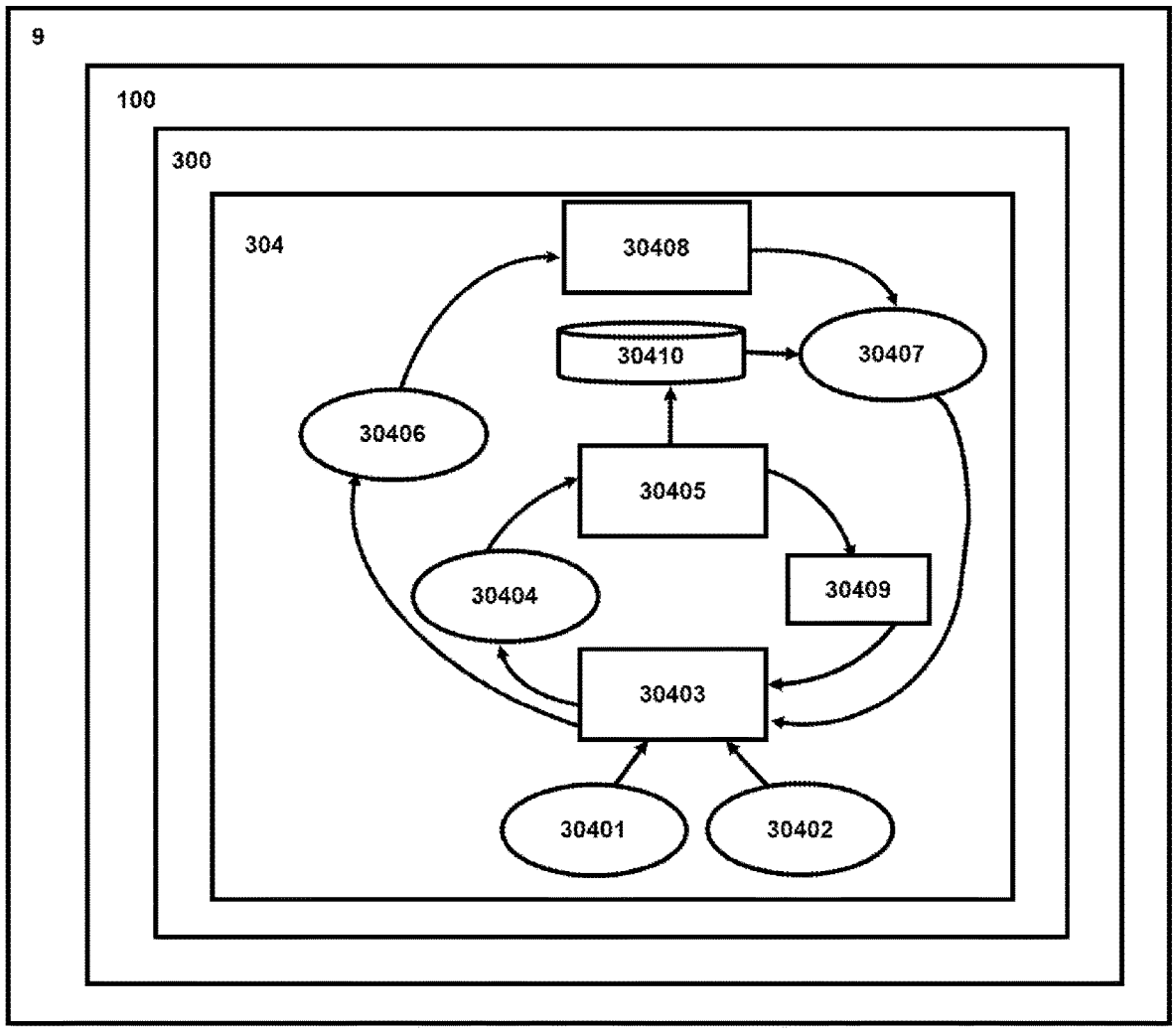

FIG. 1 diagrammatically depicts the system of Claim 1.
FIG. 2. diagrammatically depicts a virtual machine according to the present invention.
FIG. 3 diagrammatically depicts the process flow of execution of rules by the rules engine of the present invention.
FIG. 4 diagrammatically depicts the execution process of the rules engine of the present inventions.
FIG. 5 diagrammatically depicts the execution process during cognitive modelling if the present invention.
FIG. 6. diagrammatically depicts functions of model managing of the present invention.

DETAILED DESCRIPTIONS OF THE DRAWINGS

Referring now to FIG. 1 which diagrammatically depicts the architecture of an apparatus 1. Bare metal processor 2 is operably coupled to hardware assets 4 and software assets 8 and a virtual machine managing means 3 protected by microvisor code 12 in embedded read-only memory 13 that starts as the first instruction at boot up of the bare metal processor 2 establishing and managing physically separate virtual machine 9a, 9b, and 9c in the programmable logic 6. The virtual machines 9a, 9b, and 9c, each respectively support one or more Turing Complete calculi 10 which can be anywhere that run respective software applications 5a, 5b, and 5c in three security domains (11a, 11b, and 11c) respectively. The data produced by the apparatus 1 and the respective software applications 5a, 5b, and 5c and the respective Turing complete calculus 10 in respective security domains 11a, 11b, and 11c are stored in physically separate memories 7a, 7b, 7c.

Still referring to FIG. 1. Apparatus 1 may be realized as a field programmable array such as the Xilinx Zynq Field Programmable Gate Array (FPGA). A first portion of the apparatus 1 is configured with a bare metal processor 2 in communication with hardware assets 4 which may include a power converter, clocks, analog to digital converter, digital to analog converter, and other constituents (not shown). The bare metal processor 2 is in communication with programmable logic 6 having a first portion configured with virtual machines 9a, 9b, or 9c individually associated with Turing complete calculus 10 assigned to a single security domain depicted as security domain 1 11a, security domain 2 11b, and security domain 3 11c individually coupled to a respective memory 7a, 7b, or 7c. Further, bare metal processor 2 may be coupled to one or more embedded read only memory 13 configured for securely hosting a) an initialization program that configures the bare metal processor 2 and b) may be configured with a microvisor which may be an OKL4 or other approved means for the respective security domain 11a, 11b, or 11c.

Referring now to FIG. 2, which diagrammatically depicts a virtual machine 9 according to the present invention receiving a plethora of inputs including time data 92. Metadata 93, queries 94, commands 98, and digital data 80 from data sources of the apparatus 1. The inner circle depicts the CBRS 100 processing the plethora of inputs with rules engine 200, artificial intelligence 300, managing data 400, diagnosing 500, predicting 600, cybersecurity 700, and applications 800.

Referring now to FIG. 3 which diagrammatically depicts the process flow of execution of rules within rules engine 200 within CBRS 100 within a virtual machine 9, executing rules under control of rule processing means 20601 that assures deterministic rule execution (i.e., a rule once started has a fixed amount of time to complete. At any time, rule processing means 20601 may send a metadata describing such as, but not limited to, context, plans, resources, and priorities to rule planning means [20602. Depending on the status and results of execution of rules, the rule processing means 20601 may send metadata to a rule scheduler means 20603] to establish a schedule for executing rule sets associated with a respective plan. At any time, rule processing means 20601 may send a plan metadata describing the current plan and a schedule metadata and a metadata identifying the rule set to the rule set supervisor means 20604. The rule set supervisor means 20604, in turn, sends metadata concerning the tasks and schedule to task execution means 20605. In preparation for execution of tasks of the rule set, task execution means 20605 may send a metadata describing a needed resource to logistics means 20606 to stage resources associated with the rule set. The task execution means 20605 may, from time to time, send a model metadata to modelling means 20609 that, in turn, may send a metadata regarding required resources to logistics means 20606. Depending on resources required, logistics means 20606 will send metadata to short-wait resource means 20607 and/or long-wait resource means 20608. Because the execution is deterministic, a rule may time-out for lack of a resource. Both rules and tasks have priorities and a determined time to execute which are in planning and scheduling and are honored by the rule set supervisor means 20604 which in turn can pause and/or restart a task (or task set) based on a priority by sending a message to task execution means 20605. When task execution means 20605 completes the current task set, it sends tasks completed message 20613 to rules set supervisor means 20604.

Further activity of means (rule processing means 20601, rule planning means 20602, rule scheduling means 20603, rule set supervisor means 20604, task execution means 20605, logistics means 20606) are are monitored by rules engine cyber security means 20610 that assures compliance to requirements for information assurance with physical separation of data both in the respective virtual machine 9 and respective associated memory (not shown). During execution, rule set supervisor means 20604 may send a pause rule execution command 20611 or a start rule execution command 20612 to task execution means 20605.

Referring now to FIG. 4 which diagrams the execution process of rules engine 200. At initiation of system start or reset 201, the rules engine 200 operating in virtual machine 9 processes rules until terminated by shutdown means 214 or loss of power. The process begins with initiation of rules engine 200 starting compiled rules reader 202; memory table means 203 that configures parameters of the current task(s); and configuration driver means 204 that configures drivers required for performing tasks. Autonomous task means 205 performs autonomous tasks such as generating date/time data for time stamping. Process loop means 206 executes while data is available 207. Operations performed during cycling of process loop means 206 include pipelining task parameters 208 and starting scheduled tasks 209. Process loop means 206 cycles until interrupted, and restarts when the interruption clears. From time to time, interrupt assertion means 212 recognizes and sends metadata declaring a priority interrupt to interrupt handling means 210; for example, an interrupt to event handling means 213 to terminate rule processing. When the interrupt ends or times out or is countermanded, interrupt clearing means 211 clears the interruption and processing is restored.

Referring now to FIG. 5 which diagrams the processes of the artificial intelligence 300 of CBRS 100 operating in virtual machine 9 interacting with Bayesian configuration management means 304. (All interactions are shown by lines connecting elements of the diagram.) Metadata concerning context from Bayesian configuration management means 304 is processed by schema librarian means 301 which selects a current schema 312 based on the metadata. The schema librarian means 301 sends the metadata describing the current schema 312 to model librarian means 302 which, in turn, sends metadata describing models to the Bayesian configuration management means 304, which maintains consistency of the models, functions, and attributes with respect to rules, requirements, design, and context. Data sourcing means 303 transmits live data 314 to Bayesian configuration management means 304, which uses current schema 312 to produce metadata which is input to situation specific inference means 305, which, in turn, sends metadata describing a Bayesian model 315, current logic 313 and live data 314 to deductive reasoning means 309, abductive reasoning means 310, and inductive data means 311. The probabilities produced by deductive reasoning means 309, abductive reasoning means 310, and inductive data means 311 are input to dynamic data fusion means 306, which exercises Bayesian model 315, which produces probabilities, confidence bounds and related information that comprise Fusion output 316. Security reasoning means 307 receives threat data information and both sends and receives security related data to/from dynamic data fusion means 306 and also publishes security messages 317 to subscribers (not shown) and receives threat alerts 318 which may be, for example, from a security means (not shown).

Now referring to FIG. 6 which diagrams how Bayesian configuration management means 304 of the artificial intelligence 300 of CBRS 100 in virtual machine 9 uses context switching for handling a non-stationary stochastic process that receives data from data sources, which are characterized by near-stationary, slowly evolving stochastic processes and fast changing stochastic processes, by modeling context. A person of ordinary skill in the art of modeling context would realize that modeling context represents the switching between the "snapshot" models that correspond to these simpler stochastic processes.

First, modeling context allows the system to reduce the size of the resulting model. This reduction improves the efficiency of inferencing across the model, which is especially crucial in modeling dynamically changing systems. Second, modeling context enables understanding of the meaning of changes of non-stationarity data in context of the current situation. Furthermore, we have identified a strong connection between causal relationships and context. We feel that contextualized mechanisms that support causality can capture and simplify the regularities underlying sets of data. The causal model identifies and utilizes causal structure. Since our model is an attempt to "explain" the events as supported by the data, context is used to filter out irrelevant information while reorganizing a current model; similarly, humans ignore redundant and irrelevant information when updating or rebuilding their internal knowledge of situations.

Still referring to FIG. 6, the architecture diagrammed in FIG. 6 has two concentric loops. The outer loop features context means 30408 which induces a causal model controls knowledge-based model construction. The inner loop represents the execution sequence in case of stationary system data 30401 and world data 30402 arriving and CBRS model means 30403 updates the CBRS model using a knowledge base model construction algorithm to adjust the parameters of the CBRS model to incorporate the new data using parameter fitting algorithms.

Still referring to FIG. 6. When the new data is not static (i.e., changes drastically), failure to update 30406 results, updating the model will fail, and execution shifts to context means 30408 where inference algorithms determine the causal structure of the new data producing new causal model

30407 which flows to CBRS model construction means 30409 which constructs a new CBRS model that flows to CBRS model means 30403 which, in turn, constrains the choice of rules from the knowledge base 30410 by the knowledge base means 30405 model construction algorithm. Note that the world and the user do not directly control the knowledge base, but rather influence it via the current model.

The foregoing description details certain preferred embodiments of the present invention and describes the best mode contemplated. It will be appreciated, however, that the invention can be practiced in many ways and is not intended to be limited or restricted in any fashion except as defined in the claims which follow, and any equivalents thereto.

What is claimed is:

1. A system for implementing security of an entity comprising:
   - at least one data sourcing means for obtaining a first data and subsequent data;
   - a field programmable cellular automata implemented with simple logic cells not including any hardware processor means for configured with at least one electronic circuit for mapping truth selected from the group consisting of, "OR", "AND", "NAND (not AND)", "NOR (not OR)", and "X-OR (exclusive OR)";
   - a Cognitive Bayesian Reasoning System (CBRS) for performing cognitive fusion computing actions operably implemented with said cellular automata; and,
   - wherein said CBRS in response to changes in the first data and subsequent data implements security of an entity by performing at least one computing action selected from the group consisting of inference, inductive reasoning, abductive reasoning, deductive reasoning, machine learning, and evolving neural models.

2. The system of claim 1 further comprising:
   - a programmable means for processing images;
   - an automated control algorithm for enabling virtual machines for both permitting access to and/or preventing unauthorized access to said data sourcing means; and
   - a cross-domain solution (CDS) wherein specialized programmatically controlled interfaces both enable and/or restrict the access or transfer of a data between two or more security domains based on a security policy.

3. The system of claim 2 wherein the automated control algorithm is configured with embedded read-only memory 13 for storing a security algorithm 12.

4. The system of claim 1 further configured with a memory 7 for storing programs and data.

5. The system of claim 1 further configured with a communication means configurable for communication of data.

* * * * *